US012611813B2

(12) United States Patent
Morisue et al.

(10) Patent No.: US 12,611,813 B2
(45) Date of Patent: Apr. 28, 2026

(54) TRANSFER METHOD, TRANSFER APPARATUS, AND PEELING METHOD

(71) Applicant: CANON KABUSHIKI KAISHA, Tokyo (JP)

(72) Inventors: Masafumi Morisue, Tokyo (JP); Hiroshi Higuchi, Kanagawa (JP); Takashi Sugawara, Kanagawa (JP); Makoto Taguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/504,268

(22) Filed: Nov. 8, 2023

(65) Prior Publication Data
US 2024/0208135 A1 Jun. 27, 2024

(30) Foreign Application Priority Data

Dec. 21, 2022 (JP) ................................. 2022-204322

(51) Int. Cl.
 *B29C 63/00* (2006.01)
(52) U.S. Cl.
 CPC ................................ *B29C 63/0013* (2013.01)
(58) Field of Classification Search
 CPC ............ B29C 63/0013; B29C 65/8223; B32B 37/025
 USPC ........................................................ 156/247
 See application file for complete search history.

(56) References Cited

U.S. PATENT DOCUMENTS

| | | | |
|---|---|---|---|
| 10,625,507 B2 | 4/2020 | Sasaki et al. | |
| 2001/0025692 A1* | 10/2001 | Lien | B32B 38/10 156/543 |
| 2004/0026363 A1* | 2/2004 | Akamatsu | H05K 3/007 216/13 |

FOREIGN PATENT DOCUMENTS

JP 2019-25853 A 2/2019

OTHER PUBLICATIONS

Monteiro, Y., et al., "Influence of the Temperature on the Viscosity of Different Types of Silicone", journal/plastination.org, pp. 1-10, Jul. 31, 2018. (Year: 2018).*
Sugawara et al., U.S. Appl. No. 18/528,943, filed Dec. 5, 2023.

* cited by examiner

*Primary Examiner* — Abbas Rashid
*Assistant Examiner* — Gregory C. Grosso
(74) *Attorney, Agent, or Firm* — Venable LLP

(57) ABSTRACT
A transfer material is stably transferred to a transfer object. A transfer method for transferring to the object the transfer material applied to a film portion fixed to a frame portion includes peeling a film portion from the object. In the peeling, while a first side of the frame portion is elevated, a roller portion is moved in a direction from the first side toward a second side so that the position of a boundary line between a peeled region where the film portion is peeled off from the object and an unpeeled region where the film portion is not peeled off from the object coincides with the position of a rotation shaft in the roller portion pressing the film portion while rotating.

9 Claims, 15 Drawing Sheets

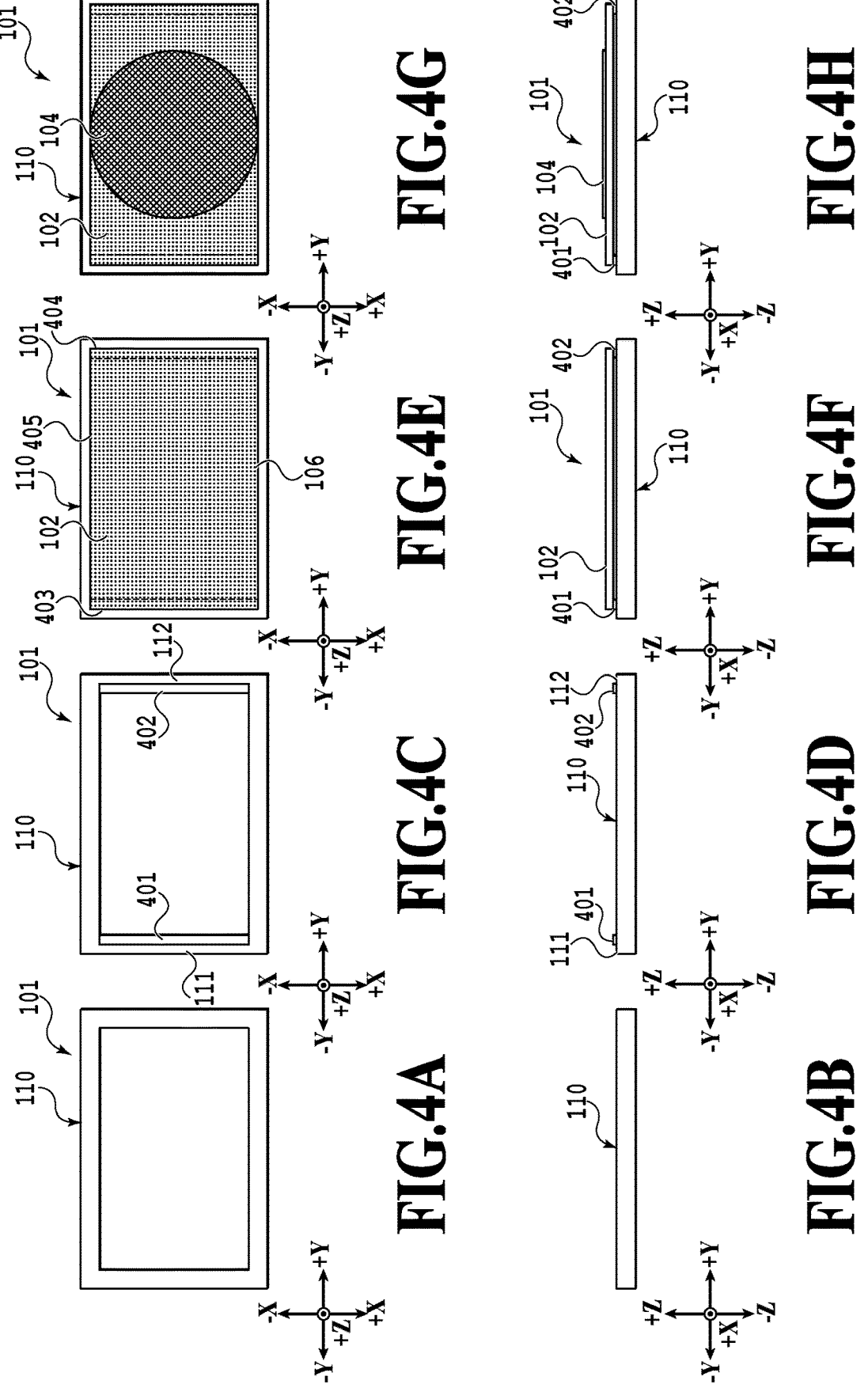

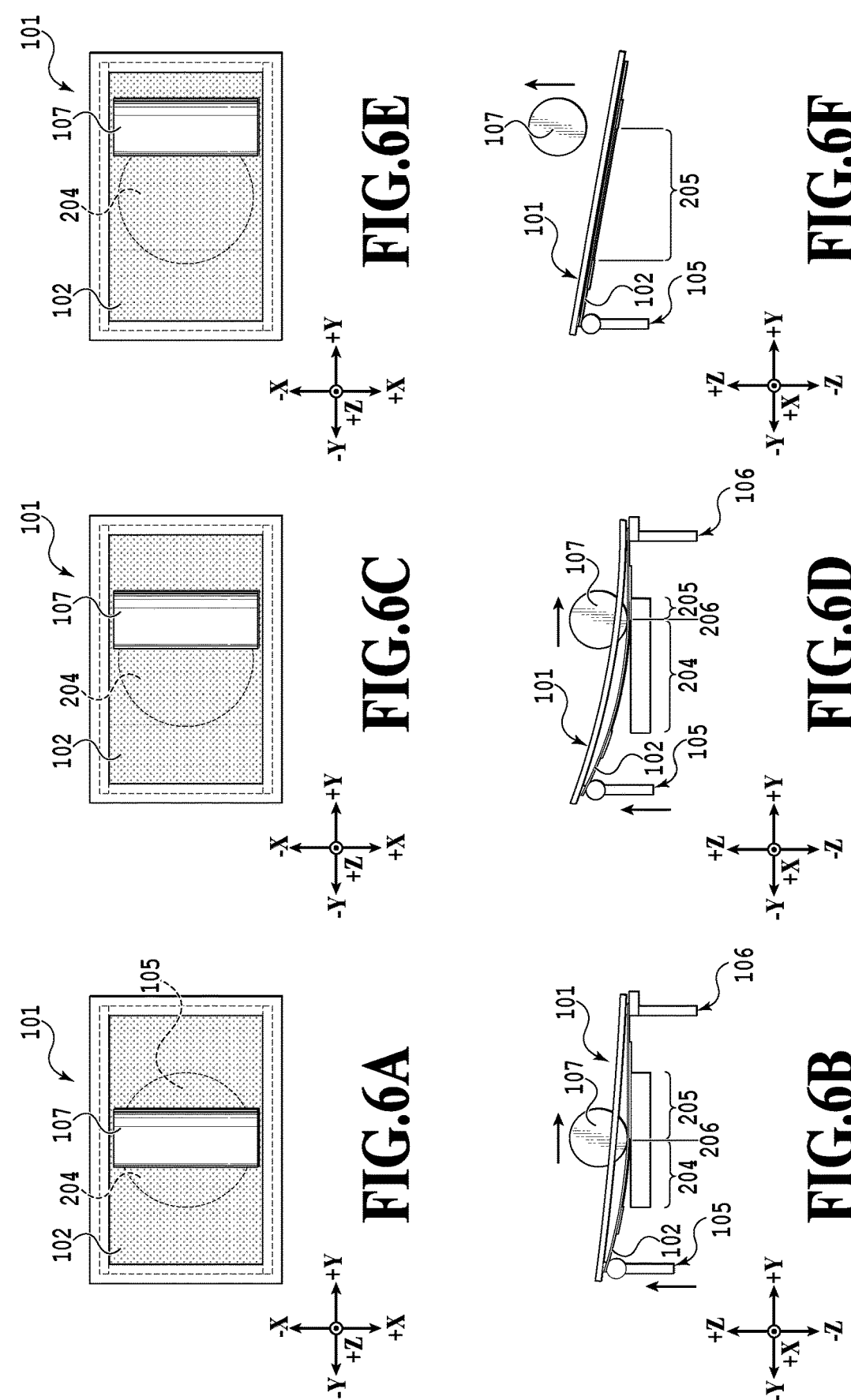

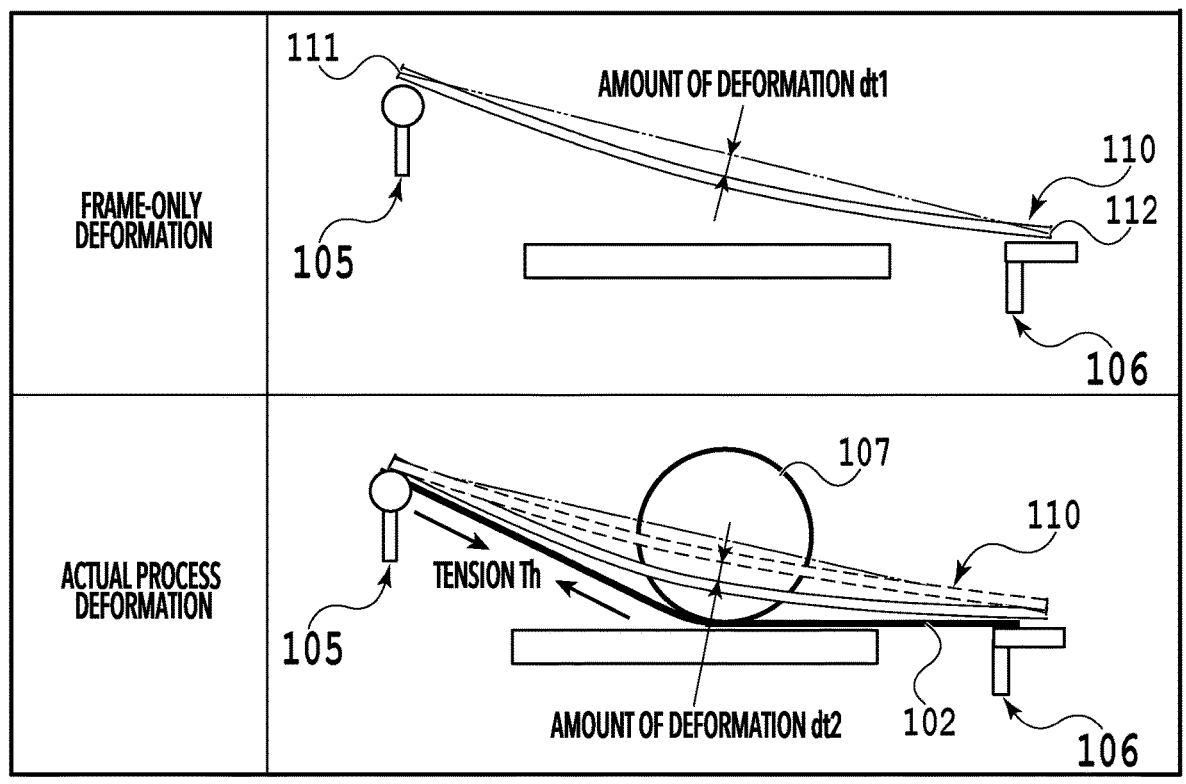
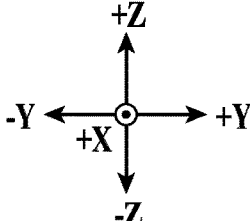
FIG.9

TRANSFER METHOD, TRANSFER APPARATUS, AND PEELING METHOD

FIELD OF THE DISCLOSURE

The present disclosure relates to a transfer method, a transfer apparatus, and a peeling method.

DESCRIPTION OF THE RELATED ART

In the case of forming a transfer material layer on an object, the transfer material layer may not be formed directly on the object but may be formed indirectly on the object. Methods for indirectly forming a transfer material layer on an object include a method of transferring a transfer material to the object.

Japanese Patent Laid-Open No. 2019-025853 discloses a transfer method in which a transfer material is applied in advance to a film portion fixed to a frame portion, and after the transfer material is adhered to an object (also referred to as "transfer object") via the film portion, the film portion is peeled off from the transfer object while the frame portion is bent. Japanese Patent Laid-Open No. 2019-025853 also discloses peeling off the film portion while pressing the film portion using a roller portion.

However, in the peeling step in Japanese Patent Laid-Open No. 2019-025853, since the frame portion is bent along a side with relatively low rigidity, a peeling force is not transmitted to the point of application of peeling, and the peeling may stop halfway. Thus, an object of the transfer method according to the present disclosure is to provide a technique for stably transferring a transfer material to a transfer object.

SUMMARY

A transfer method for transferring to an object a transfer material applied to a film portion fixed to a frame portion, the transfer method having: adhering the film portion to the object so that a layer of the transfer material is formed between the object and the film portion; and peeling off the film portion from the object by, while elevating a first side of the frame portion above a second side opposite to the first side, moving, in a direction from the first side toward the second side, a roller portion pressing a surface to which the transfer material is not applied in the film portion while rotating, wherein in the peeling, while the first side is elevated, the roller portion is moved in the direction from the first side toward the second side so that a position of a boundary line between a peeled region where the film portion is peeled off from the object and an unpeeled region where the film portion is not peeled off from the object coincides with a position of a rotation shaft in the roller portion.

Further features of the present disclosure will become apparent from the following description of exemplary embodiments with reference to the attached drawings.

BRIEF DESCRIPTION OF THE DRAWINGS

FIGS. 4A to 4H are diagrams for explaining the step of applying an adhesive agent according to one embodiment;

FIGS. 6A to 6F are diagrams for explaining the step of peeling off the film portion according to one embodiment;

FIG. 9 is a diagram for explaining the relationship between deformation of the frame portion and the tension applied to the film portion according to one embodiment;

DESCRIPTION OF THE EMBODIMENTS

Hereinafter, embodiments in the technique according to the present disclosure will be described with reference to the drawings.

First Embodiment

First Transfer Apparatus 100

Figure 1:
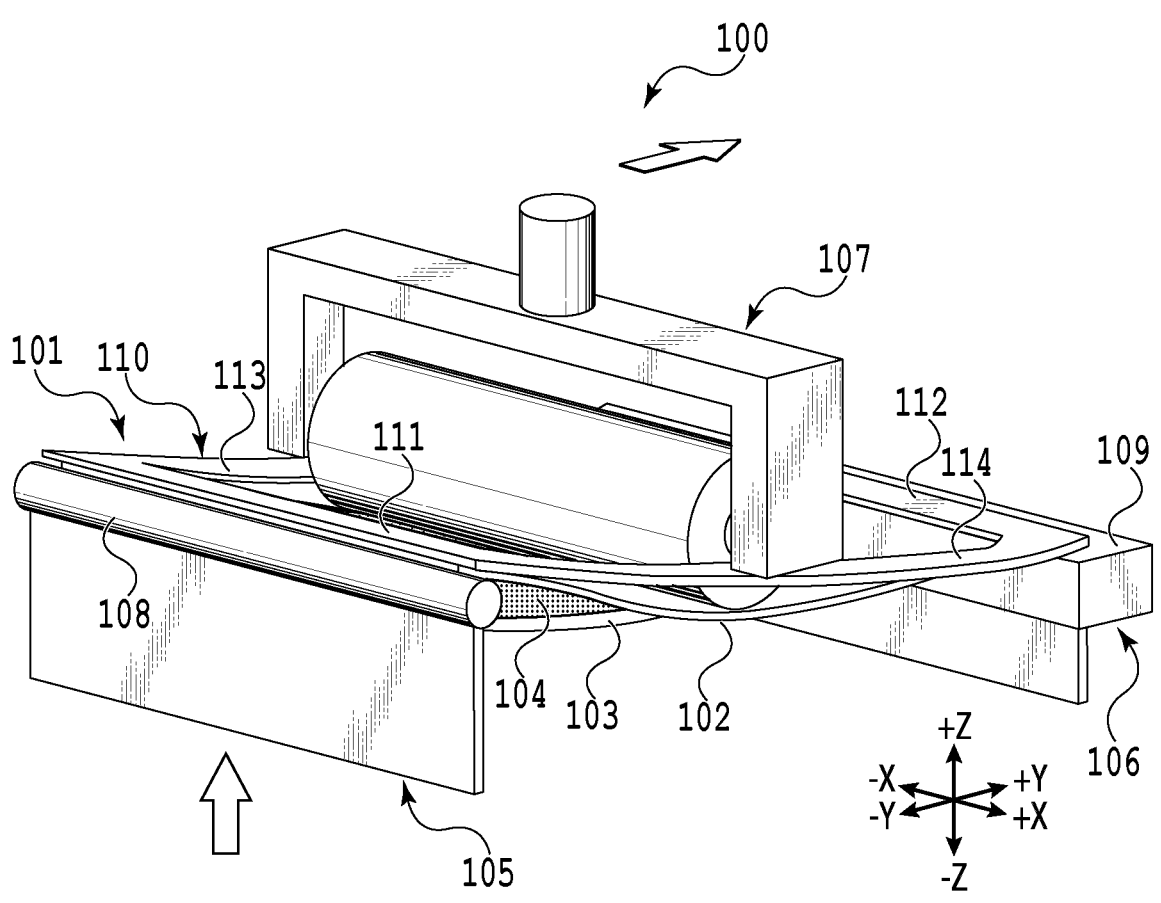
FIG. 1 is a schematic perspective view of a transfer apparatus according to one embodiment.

FIG. 1 is a schematic perspective view of a first transfer apparatus 100 that can be used in a transfer method according to the present embodiment.

In each figure in the present specification, an X direction indicates the width direction of the first transfer apparatus 100. A Y direction indicates the depth direction of the first transfer apparatus 100. A Z direction indicates the height direction of the first transfer apparatus 100. It should be noted that a surface facing a +Z direction of the first transfer apparatus 100 is referred to as "upper surface" as appropriate. A surface facing a −Z direction of the first transfer apparatus 100 is referred to as "lower surface" as appropriate. A surface facing the X direction of the first transfer apparatus 100 is referred to as "side surface" as appropriate. The X direction, Y direction, and Z direction are orthogonal to each other.

The transfer method according to the present embodiment includes an application step of applying a transfer material to a film portion 102 of a frame jig 101, an adhesion step of adhering the film portion 102 to a transfer object 103, and a peeling step of peeling off the film portion 102 from the transfer object 103.

The first transfer apparatus 100 according to the present embodiment is used to perform the adhesion step and the peeling step. It should be noted that FIG. 1 shows the step of peeling off a transfer material (e.g., an adhesive agent 104) according to the present embodiment.

As shown in FIG. 1, the first transfer apparatus 100 includes a first supporting base 105 and second supporting base 106 capable of supporting the frame jig 101, and a roller portion 107 capable of pressing the upper surface of the film portion 102 while rotating. The first supporting base 105 includes a first disposing portion 108 on which the frame jig 101 is disposed and a driving unit (not shown) capable of elevating and lowering the first disposing portion 108. The second supporting base 106 is arranged opposite to the first supporting base 105. The second supporting base 106 includes a second disposing portion 109 on which the frame jig 101 is disposed.

The frame jig 101 includes a quadrilateral frame portion 110. The film portion 102 is fixed to the frame portion 110. The frame portion 110 includes a first frame side 111 that can be disposed on the first disposing portion 108 and a second frame side 112 opposite to the first frame side 111. The frame portion 110 further includes a third frame side 113 connecting one end of the first frame side 111 and one end of the second frame side 112, and a fourth frame side 114 connecting the other end of the first frame side 111 and the other end of the second frame side 112. The first frame side 111 and the second frame side 112 fix the film portion 102. It should be noted that the third frame side 113 and the fourth frame side 114 do not fix the film portion 102.

The first transfer apparatus 100 also includes a driving unit (not shown) capable of elevating, lowering, and reciprocally moving the roller portion 107. The first transfer apparatus 100 further includes a control unit capable of controlling the driving of the first supporting base 105 and the driving of the roller portion 107.

In the peeling step according to the present embodiment, the first frame side 111 is lifted by driving the driving unit for elevating the first disposing portion 108. On the other hand, the second supporting base 106 supports the second frame side 112 but does not operate. Since the first frame side 111 is lifted by the first supporting base 105 with the second frame side 112 supported by the second supporting base 106, such a configuration makes it possible to peel off the film portion 102 from the transfer object 103.

However, it is difficult to stably peel off the film portion 102 simply by lifting the first frame side 111. Thus, in the present embodiment, the first supporting base 105 and the roller portion 107 are moved together in order to stably peel off the film portion 102.

Case that Makes it Difficult to Stably Peel Off the Film Portion 102

Examples of a case where it is difficult to stably peel off the film portion 102 include a case where no roller portion is used, a case where the rigidity of the frame portion 110 is inappropriate, and the like. That is, not only in a case where no roller portion is used, but also in a case where the rigidity of the frame portion 110 is too high or too low, it may be difficult to stably peel off the film portion 102.

Case where No Roller Portion is Used

Figure 2:
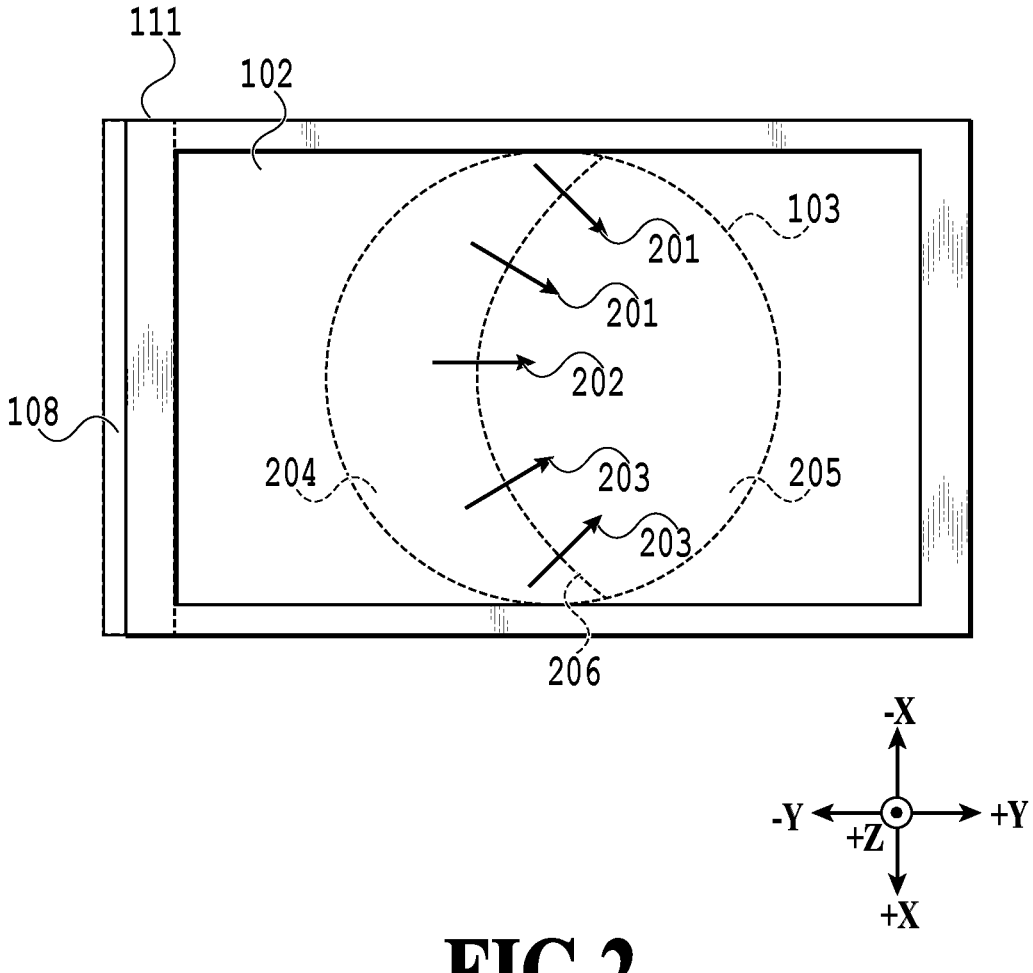
FIG. 2 is a diagram for explaining a method of peeling off a film portion without using a roller portion.

FIG. 2 is a diagram for explaining a method of peeling off the film portion 102 without using any roller portion.

Even without using any roller portion, the film portion 102 can be peeled off from the transfer object 103 by elevating the first disposing portion 108 and lifting the first frame side 111.

However, simply lifting the first frame side 111 may not allow the film portion 102 to be appropriately peeled off from the transfer object 103. This is because a peeling direction and a peeling speed at the time of peeling off the film portion 102 are not controlled. That is, in the case of not using any roller portion, the direction in which the film portion 102 is peeled off and the speed at which the film portion 102 is peeled off slightly differ within a plurality of regions in the film portion 102.

For example, the peeling direction at the end of the film portion 102 on a −X direction side is in a +Y direction and a +X direction (see a lower right arrow 201 pointing to the lower right in the figure). The peeling direction at the central portion of the film portion 102 is in the +Y direction (see a right arrow 202 pointing to the right in the figure). The peeling direction at the end of the film portion 102 on a +X direction side is in the +Y direction and a −X direction (see an upper right arrow 203 pointing to the upper right in the figure). As a result, a boundary line 206 that divides a peeled region 204 where the film portion 102 is peeled off and an unpeeled region 205 where the film portion 102 has not been peeled off has a curved shape.

In the initial phase (that is, in a −Y direction in the figure), middle phase (that is, near the center in the Y direction in the figure), and final phase (that is, in the +Y direction in the figure) of the peeling step, speeds at which the film portion 102 is peeled off vary. For example, in the middle phase of the peeling step, the peeling speed tends to be lower than in the initial or final phase. It can be considered that this is because since a peeled area is larger in the middle phase of the peeling step than in the initial or final phase, the peeling force must be larger in the middle phase than in the initial or final phase.

As described above, in the case of not using any roller portion, even in a case where the film portion 102 can be peeled off, it is difficult to stably peel off the film portion 102.

Case where the Rigidity of the Frame Portion 110 is Too High

Here, for convenience of description, a constituent similar to or corresponding to that in the present embodiment will be described using the same name and sign.

FIGS. 3A to 3D are diagrams for explaining a case where the rigidity of the frame portion 110 is inappropriate.

Figures 3A, 3B, 3C, 3D:
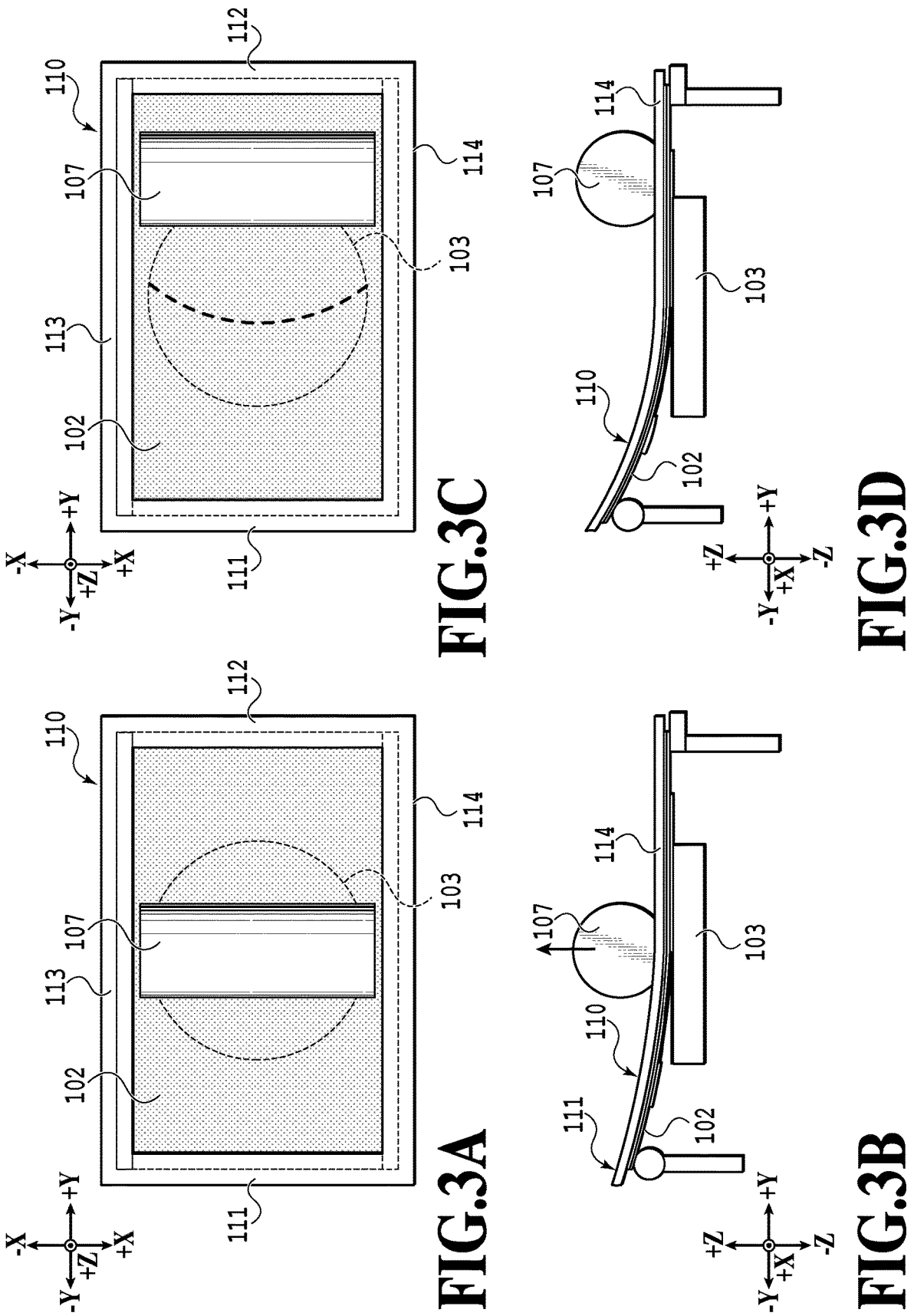
FIGS. 3A to 3D are diagrams for explaining a case where the rigidity of a frame portion is inappropriate.

FIGS. 3A and 3B are diagrams showing an example in which a third frame side 113 and a fourth frame side 114 have too high rigidity.

As shown in FIG. 3A, a roller portion 107 is used in the peeling step according to the present example. It should be noted that the four sides of the film portion 102 are fixed to the first frame side 111 to the fourth frame side 114, respectively.

As shown in FIG. 3B, in a case where the third frame side 113 and the fourth frame side 114 have too high rigidity, the frame portion 110 does not curve preferably even in the case of using the roller portion 107.

In this case, since the roller portion 107 pressing the film portion 102 is also lifted at the time of the first frame side 111 being lifted, it is difficult to peel off the film portion 102 while pressing it. That is, in a case where the rigidity of the frame portion 110 is too high, it is difficult to stably peel off the film portion 102 from the transfer object 103.

Case where the Rigidity of the Frame Portion 110 is Too Low

FIGS. 3C and 3D are diagrams showing an example in which the third frame side 113 and the fourth frame side 114 have too low rigidity.

As shown in FIG. 3C, the roller portion 107 is used in the peeling step according to the present example. It should be noted that the four sides of the film portion 102 are fixed to the first frame side 111 to the fourth frame side 114, respectively.

As shown in FIG. 3D, in a case where the third frame side 113 and the fourth frame side 114 have too low rigidity, even in the case of using the roller portion 107, the curvature of the frame portion 110 is too large. That is, in a case where the rigidity of the frame portion 110 is too low, even in a case where the first frame side 111 is lifted, no peeling force is transmitted to the point of application at which the film portion 102 is peeled off, and the peeling of the film portion 102 stops halfway. Thus, in a case where the rigidity of the frame portion 110 is too low, it is also difficult to stably peel off the film portion 102 from the transfer object 103.

Transfer Method

As described above, the transfer method according to the present embodiment includes the step of applying the adhesive agent 104, the step of adhering the film portion 102, and the step of peeling off the film portion 102. First, the application process according to the present embodiment will be described below.

Step of Applying the Adhesive Agent 104

FIGS. 4A to 4H are diagrams for explaining the step of applying the adhesive agent 104 according to the present embodiment. FIG. 4A is a top view of a first step. FIG. 4B is a side view of the first step.

As shown in FIGS. 4A and 4B, the frame portion 110 is prepared in the first step. From the viewpoint of conveyance and transfer steps, the shape of the frame portion 110 is designed and a material for the frame portion 110 is selected in consideration of weight, deformation (that is, warpage), rigidity, size of a transfer region, and the like.

FIG. 4C is a top view of a second step. FIG. 4D is a side view of the second step.

As shown in FIGS. 4C and 4D, in the second step, a first fixing portion 401 for fixing one end of the film portion 102 (not shown here) is arranged on the first frame side 111. On the other hand, a second fixing portion 402 for fixing the other end opposite to the one end of the film portion 102 (not shown here) is arranged on the second frame side 112. Examples of the first fixing portion 401 and the second fixing portion 402 include a two-sided adhesive tape, an adhesive agent, and the like. The first fixing portion 401 and the second fixing portion 402 are not limited as long as they can be arranged on the first frame side 111 and the second frame side 112, respectively. The first fixing portion 401 and the second fixing portion 402 may be selected as appropriate.

However, the first fixing portion 401 and the second fixing portion 402 need to have adhesive forces that are sufficiently larger than tension on the film portion 102 (not shown here). This is because in the peeling step according to the present embodiment, the first fixing portion 401 and the second fixing portion 402 are important locations to be the points of application at which a force that deforms (warps) the frame portion 110 is converted into tension on the film portion 102.

FIG. 4E is a top view of a third step. FIG. 4F is a side view of the third step.

As shown in FIGS. 4E and 4F, the film portion 102 includes a first film side 403 fixed to the first fixing portion 401 and a second film side 404 fixed to the second fixing portion 402. The film portion 102 further includes a third film side 405 connecting one end of the first film side 403 and one end of the second film side 404, and a fourth film side 406 connecting the other end of the first film side 403 and the other end of the second film side 404.

In the third step, the first film side 403 and the second film side 404 are fixed to the first fixing portion 401 and the second fixing portion 402, respectively. The frame jig 101 according to the present embodiment is created in this manner. On the other hand, the third film side 405 and the fourth film side 406 are not fixed to the frame portion 110. Thus, in a case where the film portion 102 is pressed by the roller portion, the film portion 102 is elastically deformed with the first film side 403 and the second film side 404 fixed to the first fixing portion 401 and the second fixing portion 402, respectively. In fixing the first film side 403 and the second film side 404 to the first fixing portion 401 and the second fixing portion 402, respectively, it is preferable to fix them while applying appropriate tension to the film portion 102.

Further, a material for the film portion 102 is not specifically limited as long as it is elastic. However, since tension is applied to the film portion 102 in a case where the film portion 102 is peeled off, a material that is too thin and has low resistance to elongation or the like is not preferable. On the other hand, a material with too high rigidity is difficult to deform and thus is not preferable. For example, in a case where the material of the film portion 102 includes PET (polyethylene terephthalate), a thickness (the length in the Z direction in the figure) is preferably 50 um to 200 um.

FIG. 4G is a top view of a fourth step. FIG. 4H is a side view of the fourth step.

As shown in FIGS. 4G and 4H, in the fourth step, the adhesive agent 104 is applied to the film portion 102 of the frame jig 101 using a common technique. Examples of a method of applying the adhesive agent 104 include spin coating. In performing spin coating, it is preferable to use a side rinse or the like after applying the adhesive agent 104 to remove the unnecessary adhesive agent 104 adhered to the frame portion 110. This is because it is possible to suppress soiling of the first transfer apparatus 100, foreign substance failure, or both of them.

A material for the adhesive agent 104 is not particularly limited as long as it has a viscosity high enough to be transferred (that is, adhered and peeled off). A common material may be used as a material for the adhesive agent 104. It does not matter whether a material for the adhesive agent 104 is thermosetting or photocurable. For example, the adhesive agent 104 includes a material that is solid at room temperature and whose viscosity decreases by being heated. Transfer conditions can be adjusted by appropriately heating the adhesive agent 104 and adjusting the viscosity according to the steps included in the transfer method.

It is also preferable that the adhesive agent 104 include a material that has no viscosity, fluidity, or neither of them in the state of being applied to the film portion 102. This is because this enables stable handling. Examples of a method of heating the adhesive agent 104 include a method of heating the transfer object 103 (not shown here) with a heater table or the like.

The step of applying the adhesive agent 104 has been described above. The step of adhering the film portion 102 then will be described below.

Step of Adhering the Film Portion 102

FIGS. 5A to 5F are diagrams for explaining the step of adhering the film portion 102 according to the present embodiment.

Figures 5A, 5B, 5C, 5D, 5E, 5F:
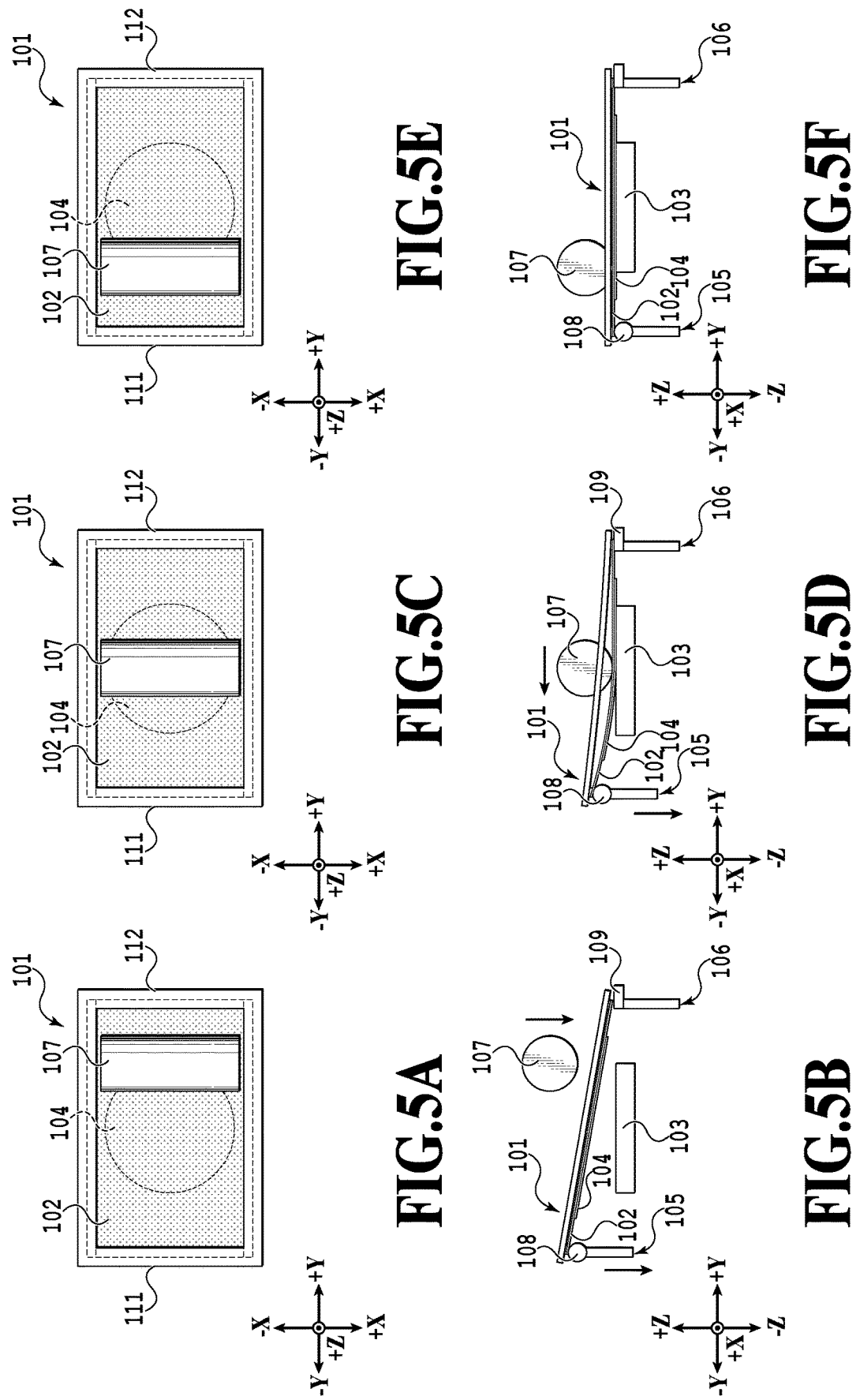
FIGS. 5A to 5F are diagrams for explaining the step of adhering the film portion according to one embodiment.

FIG. 5A is a top view of a fifth step. FIG. 5B is a side view of the fifth step.

As shown in FIGS. 5A and 5B, in the fifth step, the frame portion 110 is disposed on the first disposing portion 108 and the second disposing portion 109 with a surface to which the adhesive agent 104 is applied in the film portion 102 faced toward the transfer object 103. That is, in FIG. 5B, the frame jig 101 is upside down from the state shown in FIG. 4H.

In the adhesion step according to the present embodiment, the first disposing portion 108 is arranged in advance in a position higher than the second disposing portion 109. It should be noted that the first disposing portion 108 is arranged at a sufficient distance from the transfer object 103 in the +Z direction. This is to prevent the adhesive agent 104 from adhering to the transfer object 103 at an unexpected time.

The first frame side 111 and the second frame side 112 are disposed on the first disposing portion 108 and the second disposing portion 109, respectively, with the positional relationship between the first disposing portion 108 and the second disposing portion 109 maintained. In the present embodiment, the frame jig 101 is disposed on the first supporting base 105 and the second supporting base 106, but is not fixed. This is because the frame jig 101 may move while subtly changing its angle, position, or both of them in the state of being supported by the first supporting base 105 and the second supporting base 106.

The roller portion 107 is located in advance above the frame jig 101 and near the second frame side 112. The roller portion 107 is then lowered with respect to the film portion 102 from that position.

FIG. 5C is a top view of a sixth step. FIG. 5D is a side view of the sixth step.

As shown in FIGS. 5C and 5D, the film portion 102 is adhered to the transfer object 103 in the sixth step. Specifically, the first supporting base 105 is lowered with respect to the transfer object 103 while supporting the frame jig 101. The roller portion 107 then moves from the +Y direction side in the −Y direction side while pressing the adhesive agent 104 against the transfer object 103 via the film portion 102 in conjunction with the operation of lowering the first supporting base 105. In the sixth step, while the first frame side 111 is lowered, the roller portion 107 is moved so that the position of a boundary line that divides an adhered region where the film portion 102 is adhered and an unadhered region where the film portion 102 has not been adhered coincides with the position of the rotation shaft of the roller portion 107. The roller portion 107 is moved in a direction along a direction from the second frame side 112 toward the first frame side 111.

FIG. 5E is atop view of a seventh step. FIG. 5F is a side view of the seventh step.

As shown in FIGS. 5E and 5F, in the seventh step, in a case where the film portion 102 is adhered to the entire upper surface of the transfer object 103, the roller portion 107 temporarily stops. At this point in time, the movement of the roller portion 107 and the lowering of the first supporting base 105 are synchronized under appropriate conditions, so that the adhesive agent 104 is adhered to the transfer object 103 without bearing air bubbles or the like.

According to such an adhesion method, an adhesive layer of the adhesive agent 104 is formed between the transfer object 103 and the film portion 102. The step of adhering the film portion 102 has been described above. The step of peeling off the film portion 102 then will be described below.

Step of Peeling Off the Film Portion 102

FIGS. 6A to 6F are diagrams for explaining the step of peeling off the film portion 102 according to the present embodiment.

FIG. 6A is a top view of an eighth step. FIG. 6B is a side view of the eighth step.

As shown in FIGS. 6A and 6B, in the eighth step, the first frame side 111 is elevated above the second frame side 112. The roller portion 107 is then moved in a direction from the first frame side 111 toward the second frame side 112 to peel off the film portion 102 from the transfer object 103. Here, while the first frame side 111 is lifted, the roller portion 107 is moved in the direction from the first frame side 111 toward the second frame side 112 in conjunction with the operation of elevating the first supporting base 105.

The speed at which the roller portion 107 is moved is controlled so that the position of the boundary line 206 dividing the peeled region 204 and the unpeeled region 205 coincides with the position of the rotation shaft of the roller portion 107 in the Y direction in the figure. As a result, as the first frame side 111 is elevated, the frame portion 110 warps downward. The film portion 102 then bends in the same direction as a direction in which the frame portion 110 warps. It should be noted that the middle phase of the peeling step is illustrated here.

According to such a peeling method, the adhesive layer of the adhesive agent 104 is broken, a portion of which remains formed in the film portion 102, while a remaining portion is to be transferred to the transfer object 103.

Figure 7A:
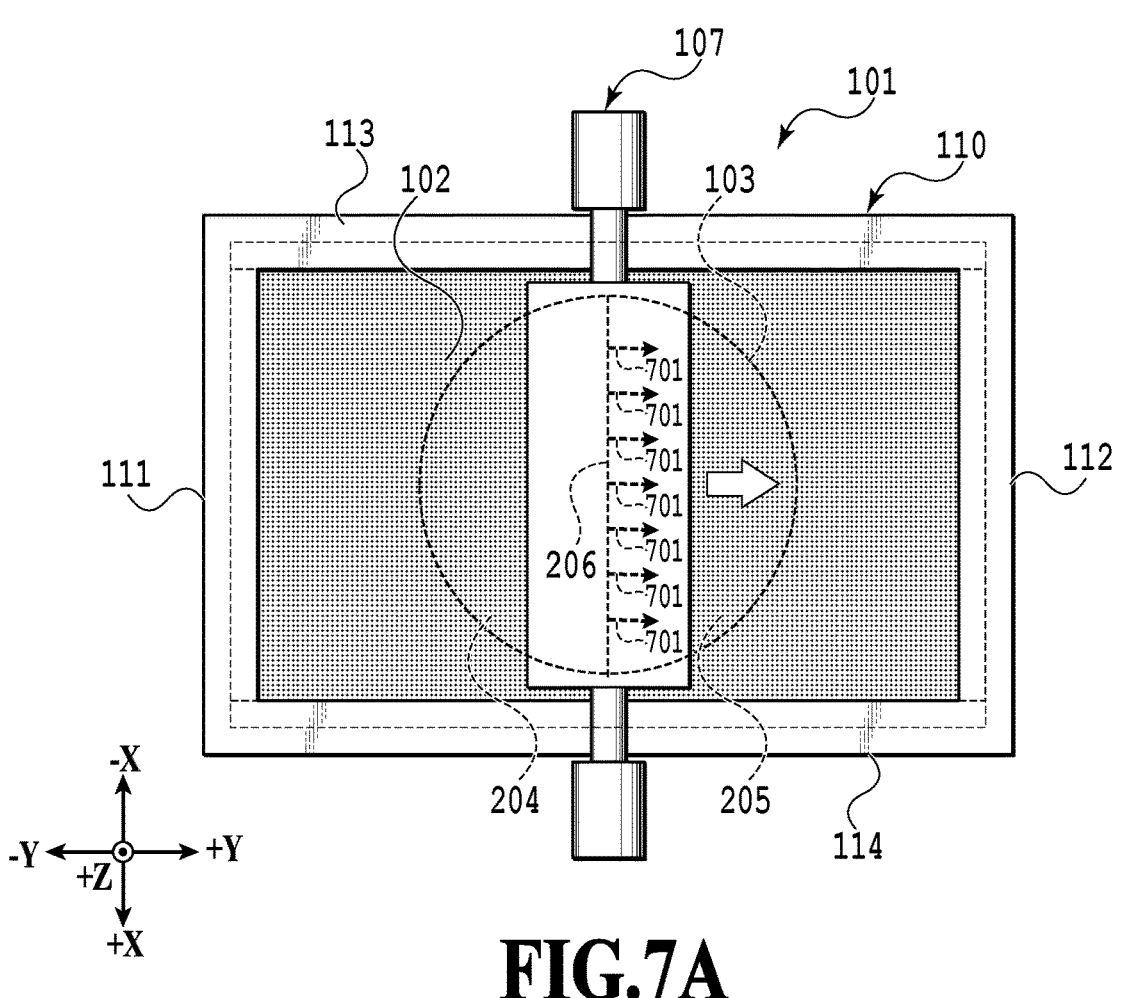
FIGS. 7A and 7B are schematic enlarged views of FIGS. 6A and 6B, respectively.
Figure 7B:
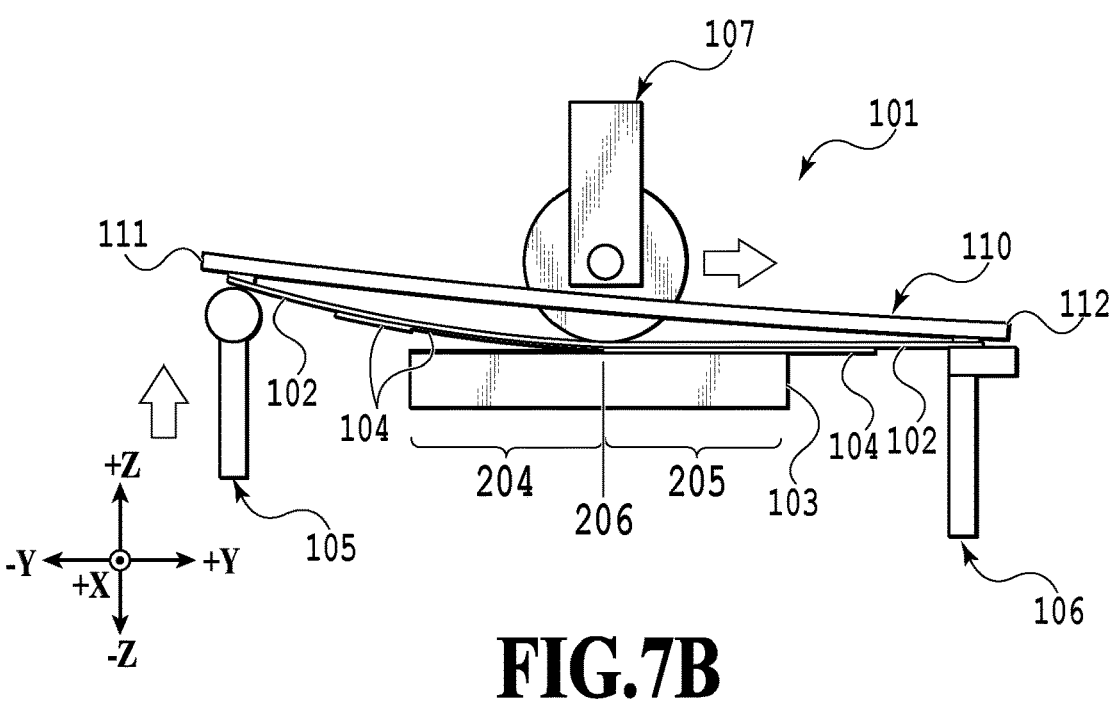

FIGS. 7A and 7B are schematic enlarged views of FIGS. 6A and 6B. FIG. 7A is a schematic plan view of FIG. 6A.

As shown in FIG. 7A, in the eighth step, while the first frame side 111 is lifted, the roller portion 107 is moved so that the position of the boundary line 206 dividing the peeled region 204 and the unpeeled region 205 coincides with the position of the rotation shaft of the roller portion 107. The roller portion 107 moves in the direction from the first frame side 111 toward the second frame side 112.

The width (the length in the X direction in the figure) of a roller provided in the roller portion 107 is designed to be smaller than the width (the length in the X direction in the figure) of an inner periphery in the frame portion 110. As described above, pressure applied by the roller portion 107 is applied to the transfer object 103 via the film portion 102 but is not applied directly to the frame portion 110.

In the eighth step, the position of the boundary line 206 dividing the peeled region 204 where the film portion 102 is peeled off and the unpeeled region 205 where the film portion 102 has not been peeled off coincides with the position of the rotation shaft of the roller portion 107 as viewed from above. Since the rotation shaft of the roller portion 107 extends in the X direction, the boundary line 206 in the film portion 102 pressed by the roller portion 107 also extends in the X direction. That is, the shape of the boundary line 206 is a straight line extending in the X direction (see an arrow 701 in the figure). Incidentally, in order to avoid problems such as the roller portion 107 moving ahead of the boundary line 206 due to a lack of a force to peel off the film portion 102, conditions such as a speed at which the first supporting base 105 is elevated, a final elevation distance, and a movement speed at which the roller portion 107 moves are appropriately set in advance.

FIG. 7B is a schematic side view of FIG. 6B.

As shown in FIG. 7B, the operation of elevating the first supporting base 105 to lift the first frame side 111 above the second frame side 112 is interlocked with the operation of the roller unit 107 pressing the transfer object 103 via the film portion 102 while rotating in the +Y direction.

Specifically, the first supporting base 105 applies a lifting force to the frame portion 110, and the roller portion 107 moves in the +Y direction while rotating without touching the frame portion 110 and applies a force to press the film portion 102.

According to such a peeling method, since the roller portion 107 moves in the +Y direction in conjunction with the elevation of the first supporting base 105, the position of the boundary line 206 transitions in the +Y direction together with the position of the rotation shaft of the roller portion 107. In other words, it is only required that the movement speed of the roller portion 107 and the speed of elevation of the first supporting base 105 be adjusted so that the boundary line 206 and the rotation shaft move while being located in the same position in the Y direction.

Thus, in a case where the first frame side 111 is lifted above the second frame side 112 and the film portion 102 is pressed by the roller portion 107, the frame portion 110 and the film portion 102 are deformed individually. It should be noted that making the speed at which the roller portion 107 moves relatively low makes it possible to control the peeling speed to the same level as in the case of not using the roller portion 107. As a result, the speed at and the direction in which the adhesive layer breaks are controlled, and the film portion 102 can be stably peeled off.

Hereinafter, referring back to FIGS. 6A to 6F, a continuation of the peeling step according to the present embodiment will be described below.

FIG. 6C is a top view of a ninth step. FIG. 6D is a side view of the ninth step. It should be noted that the final phase of the peeling step is illustrated here.

As shown in FIGS. 6C and 6D, in the ninth step, the first supporting base 105 is further elevated from the position shown in FIGS. 6A and 6B. Further, the roller portion 107 is further moved in the +Y direction from the position shown in FIGS. 6A and 6B in conjunction with the elevation of the first supporting base 105 at this time. The step of peeling off the film portion 102 proceeds in this manner.

FIG. 6E is a top view of a tenth step. FIG. 6F is a side view of the tenth step.

As shown in FIGS. 6E and 6F, in the tenth step, after peeling off the film portion 102 from the entire upper surface of the transfer object 103, the roller portion 107 is elevated and removed from the transfer object 103. At this point in time, an adhesive layer is formed on the upper surface of the transfer object 103 (not shown). After that, the frame jig 101 is collected.

A series of steps for transferring the adhesive agent 104 from the film portion 102 to the transfer object 103 is then completed.

Regarding Tension

Figures 8A, 8B:
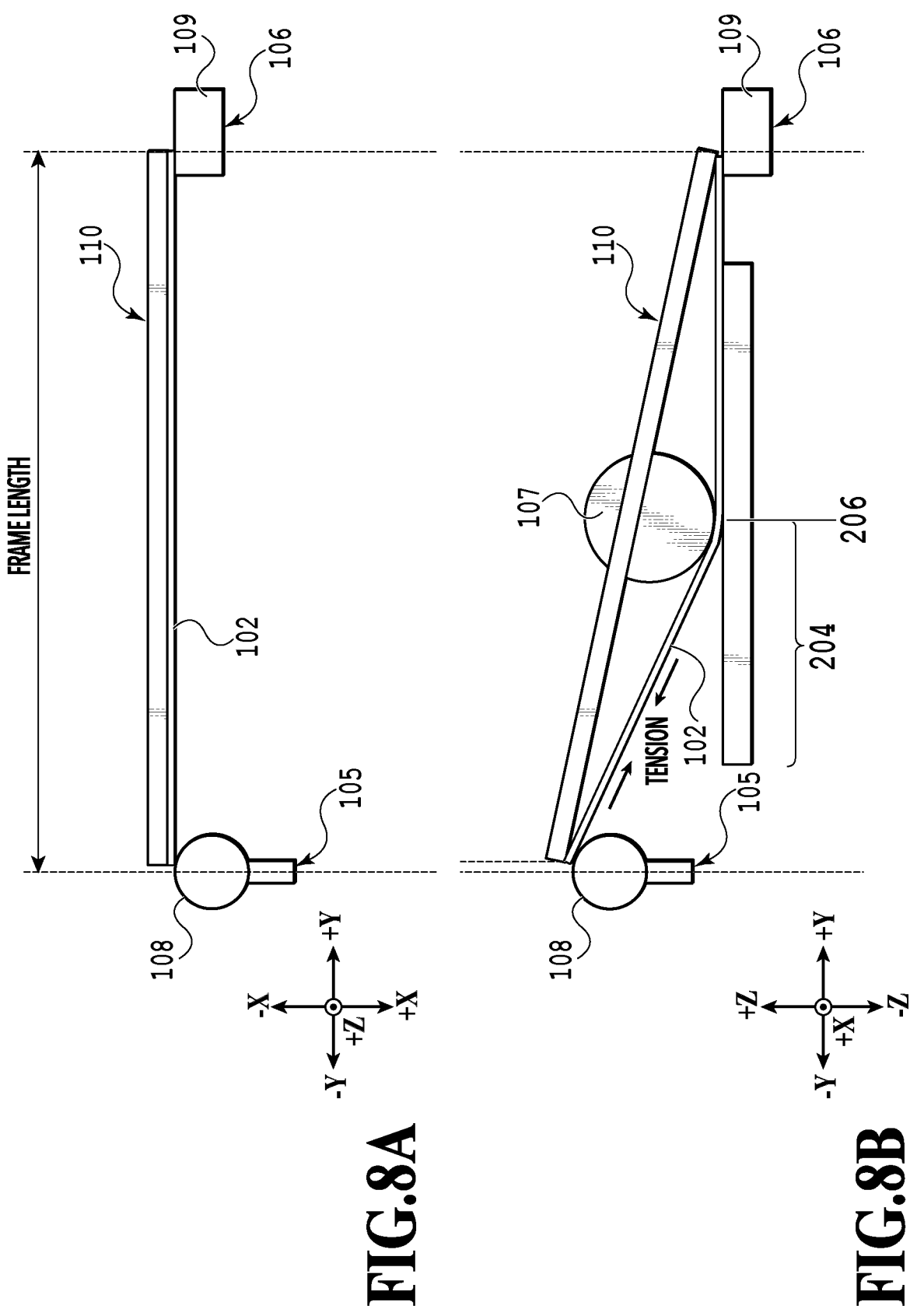
FIGS. 8A and 8B are diagrams for explaining tension on the film portion.

FIGS. 8A and 8B are diagrams for explaining tension on the film portion 102.

FIG. 8A is a diagram for explaining the length of the frame portion 110 to which the film portion 102 is fixed. Hereinafter, the length of the frame portion 110 in the Y direction will be referred to as "frame length" as appropriate.

As shown in FIG. 8A, in the present example, the frame portion 110 is disposed horizontally on the first disposing portion 108 and the second disposing portion 109 in a state where the first disposing portion 108 is not elevated. The distance from the first supporting base 105 to the second supporting base 106 is defined by the "frame length" in a case where the frame portion 110 is arranged horizontally. The length of the film portion 102 in the Y direction is the same as the "frame length."

FIG. 8B is a diagram for explaining deformation of the film portion 102.

It is assumed that in a case where the frame portion 110 has sufficiently higher rigidity than that of the film portion 102, the film portion 102 is pressed by the roller portion 107 while the first supporting base 105 is elevated as shown in FIG. 8B. A portion of the film portion 102 pressed by the roller portion 107 is then deformed downward from the frame portion 110 (in a −Z direction in the figure). The deformed film portion 102 has a geometric distance (that is, an actual length) longer than the "frame length."

In the peeling method according to the present embodiment, in a state where no external force is applied to the film portion 102, the film portion 102 is considered substantially not to be deformed. Thus, with the film portion 102 pressed by the roller portion 107, the geometric distance is longer due to the peeled region 204 being stretched, so that a force to return the length of the peeled region 204 to an original length is applied to the film portion 102. That is, tension (see the arrows in the figure) higher than in a state where the film portion 102 is not deformed is applied to the film portion 102 deformed in this way. This tension is applied as a peeling force to the adhesive agent 104 (not shown here) located below the roller portion 107 via the film portion 102.

Accordingly, tension on the film portion 102 can be applied as a peeling force to the boundary line 206 at an angle. Thus, according to such a peeling method, even in a case where the rigidity of the frame portion 110 is relatively high, since the film portion 102 pressed by the roller portion 107 is deformed, it is possible to suppress the roller portion 107 being lifted together with the film portion 102. On the other hand, even in a case where the rigidity of the frame portion 110 is relatively low, tension is generated on the film portion 102, so that the peeling force can be applied efficiently. Thus, the transfer method according to the present embodiment makes it possible to stably transfer an adhesive agent (not shown here) over a wider range.

Incidentally, depending on the rigidity of the frame portion 110, the film portion 102, or both of them, there is a case where variations in the geometric distance may be absorbed not only by the deformation of the film portion 102 but also by the deformation of the frame portion 110.

FIG. 9 is a diagram for explaining the relationship between the deformation of the frame portion 110 and tension applied to the film portion 102 according to the present embodiment.

First, a description will be given of a case where only the frame portion 110 is deformed as shown in an upper portion in FIG. 9. As illustrated, in a case where the first frame side 111 is lifted by the first supporting base 105 with the second frame side 112 supported by the second supporting base 106, the frame portion 110 is deformed downward into a warped shape. Hereinafter, a first deformation amount is the amount by which the central portion of the frame portion 110 is deformed in this case and is defined as "dt1."

Next, a description will be given of a case where the frame portion 110 and the film portion 102 are deformed as shown in a lower portion in FIG. 9. It is assumed that, as illustrated, the first frame side 111 is lifted by the first supporting base 105 with the second frame side 112 supported by the second supporting base 106, and the film portion 102 is pressed by the roller portion 107. The frame portion 110 and the film portion 102 are then deformed into a shape curved downward. In this case, the amount of deformation of the frame portion 110 is larger than the first deformation amount dt1.

Hereinafter, for convenience of description, a second deformation amount generated at the central portion of the frame portion 110 in this case is defined as "dt2." Here, a comparison between "dt1" and "dt2" described above shows that the relational expression "dt1<dt2" is established. This is because the amount of deformation of the film portion 102 is larger than the amount of deformation of the frame portion 110 and that tension on the film portion 102 is applied to the frame portion 110.

Hereinafter, tension on the film portion 102 applied to the frame portion 110 in this case will be referred to as "film tension" and expressed as "Th." The amount of deformation of the frame portion 110 due to the film tension (hereinafter referred to as "frame deformation amount") is the amount of deformation obtained by subtracting "dt1" from "dt2" ("dt2"−"dt1").

Here, the relationship between the film tension and the amount of deformation can be mostly expressed using the following relational expression. First, it is assumed that moment (hereinafter referred to as "M" as appropriate) due to the film tension is applied to the first frame side 111. It should be noted that in a case where the shape and dimensions of the frame portion 110 are the same as those in the examples in FIGS. 8A and 8B and the thickness (the length in the Z direction in the figure) of the frame portion 110 is "h," the moment "M" due to the film tension is obtained by Formula 1 below.

$$M = Th \times \frac{h}{2} \qquad \text{Formula 1}$$

In a case where this moment is applied to the first frame side 111, the amount of deformation dt at the central portion of the frame portion 110 and the tension Th can be obtained by Formula 2 below using a formula for deflection of a simple beam. In Formula 2, "L" indicates a "frame length" (see FIGS. 8A and 8B), "E" indicates the coefficient of elasticity of a material in the frame portion 110, and "I" indicates a cross-sectional secondary moment in the shape of the frame portion 110.

$$dt = \frac{ML^2}{16EI} = \frac{hL^2}{32EI} \times Th \qquad \text{Formula 2}$$

In the present embodiment, considering that the cross section of the frame portion 110 is rectangular and that the number of sides to which the film portion 102 is fixed is two, the cross-sectional secondary moment "I" can be obtained by Formula 3 below.

$$I = 2 \times \frac{bh^3}{12} \qquad \text{Formula 3}$$

Thus, the amount of deformation "dt" and the film tension "Th" have the relationship shown in Formula 4 below.

$$dt = \frac{3L^2}{16Ebh^2} \times Th \qquad \text{Formula 4}$$

In view of the above, in the present embodiment according to the present disclosure, the relationship between the film tension "Th" and the amount of deformation ("dt2"– "dt1") of the frame portion 110 is expressed using Formula 5 below.

$$Th = \frac{16Ebh^2}{3L^2} \times (dt2 - dt1) \qquad \text{Formula 5}$$

According to Formula 5, under circumstances where the film portion 102 is peeled off while the frame portion 110 is deformed, the amount of deformation of the frame portion 110 increases as the film tension increases. A large external force is also applied in a direction in which the elongation of the film portion 102 is eased. That is, in this case, a large external force is applied in a direction in which the film portion 102 is returned to its original shape.

As the film tension decreases, the amount of deformation of the frame portion 110 also decreases. The external force applied in the direction in which the film portion 102 is returned to its original shape also decreases. Further, in a case where a state in which no external force is applied to the film portion 102 changes to a state in which an external force is applied to the film portion 102, the film tension is applied in a direction in which the film portion 102 is stretched. That is, the deformation of the frame portion 110 also adjusts a geometric distance which is a constraint in a case where the film portion 102 is deformed and has the effect of stabilizing the film tension. As described above, the stabilization of the film tension also stabilizes a force applied to the peeling of the adhesive agent 104.

As described above, according to the method of peeling off the adhesive agent 104 according to the present embodiment, the adhesive agent 104 can be peeled off more uniformly and stably than in the conventional methods. Thus, the method of transferring a transfer material according to the present embodiment makes it possible to stably transfer the transfer material to a transfer object.

Modification of First Embodiment

In the transfer method described above, the peeling step is performed continuously after the adhesion step. The adhesion step and the peeling step according to the present embodiment may be performed simultaneously.

Figure 10A:
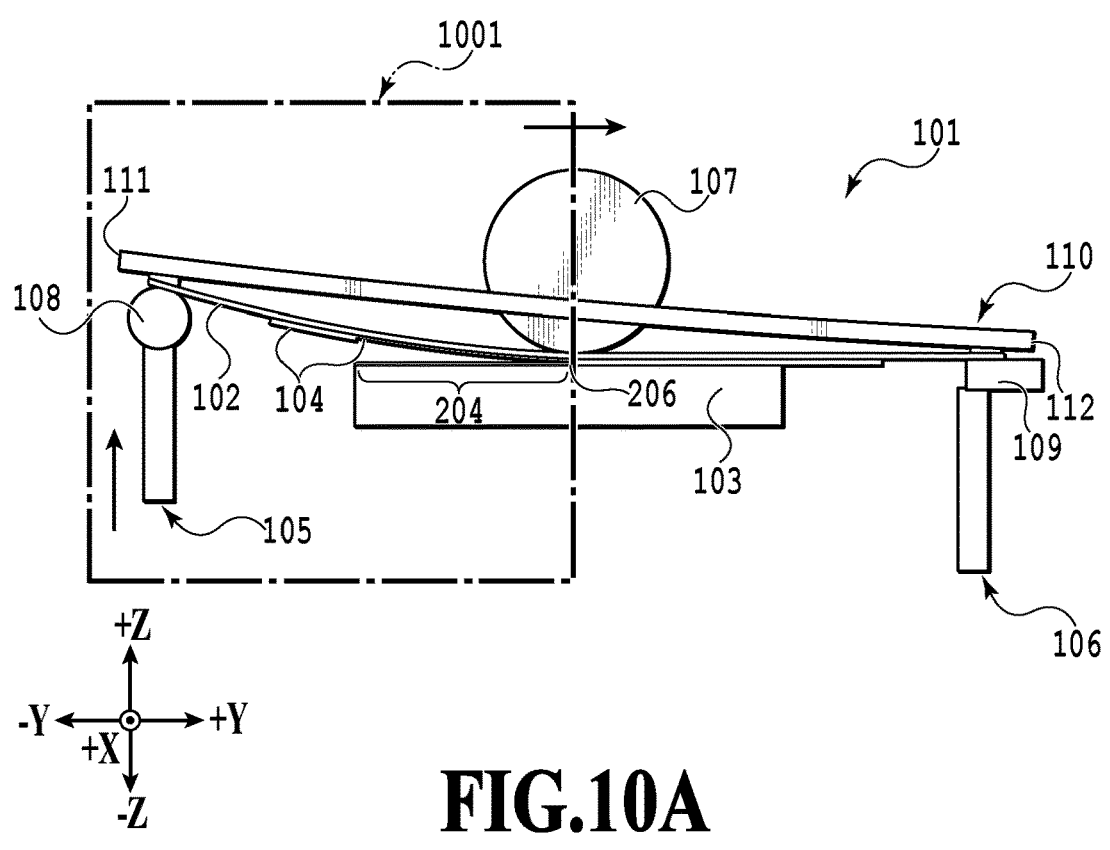
FIGS. 10A and 10B are diagrams for explaining a modification of a transfer method.
Figure 10B:
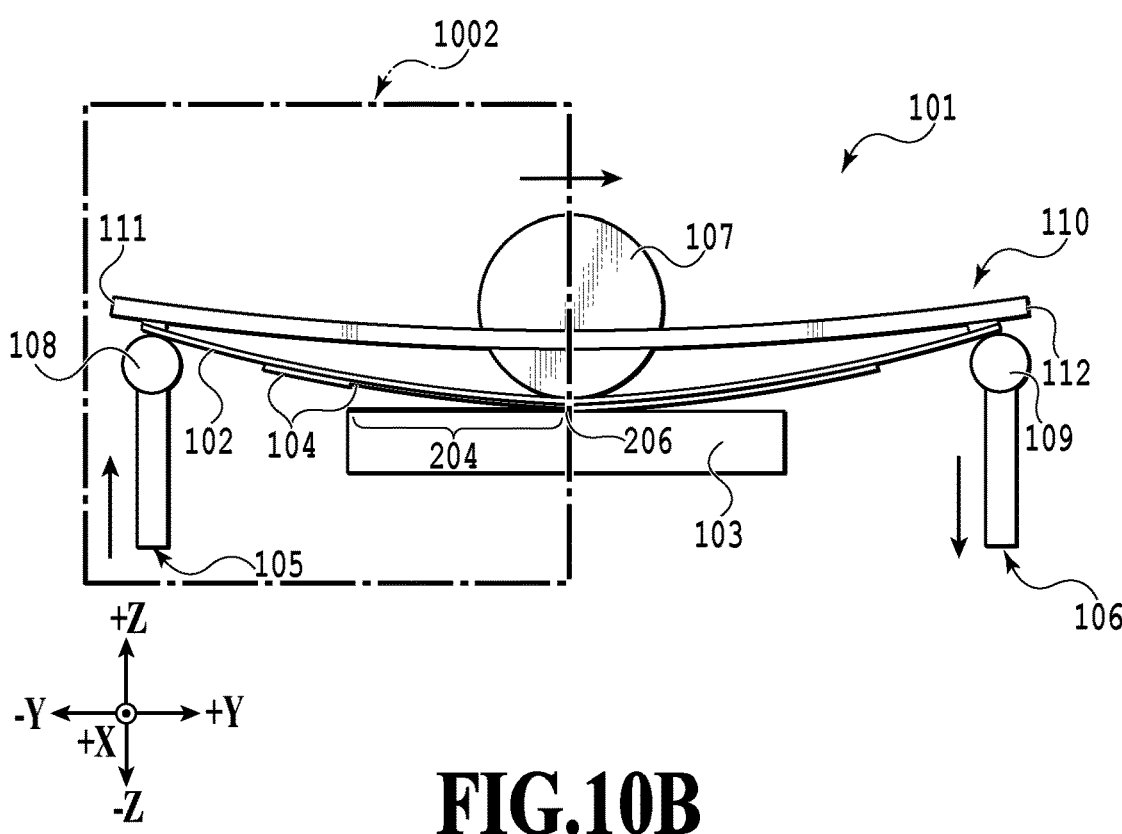

FIGS. 10A and 10B are diagrams for explaining a modification of the transfer method according to the first embodiment. FIG. 10A is a diagram showing the peeling method shown in FIG. 6B. FIG. 10B is a diagram showing a peeling method according to the present modification.

As shown in FIG. 10B, in the present modification, the elevation of the first supporting base 105, the movement of the roller portion 107, and the lowering of the second supporting base 106 are interlocked.

In the present modification, first, the first disposing portion 108 is located at the same height as that of the transfer object 103. On the other hand, the second disposing portion 109 is located above the first disposing portion 108.

Next, the frame jig 101 is disposed on the first disposing portion 108 and the second disposing portion 109 with the positional relationship between the first disposing portion 108 and the second disposing portion 109 maintained. That is, at the start of the transfer method according to the present modification, the first frame side 111 is located below the second frame side 112 (on a −Z direction side).

Next, from a state where the frame jig 101 is disposed on the first disposing portion 108 and the second disposing portion 109, the first supporting base 105 is gradually elevated, and in conjunction with the elevation, the second supporting base 106 is gradually lowered. That is, the second frame side 112 is lowered below the height at which the first frame side 111 is located. On the other hand, during an operation in which the elevation of the first supporting base 105 and the lowering of the second supporting base 106 are interlocked, the transfer object 103 is pressed via the film portion 102 while the roller portion 107 is moved from the first frame side 111 toward the second frame side 112. An interlock between the elevation of the first supporting base 105, the movement of the roller portion 107, and the lowering of the second supporting base 106 is controlled so that, for example, the first disposing portion 108 and the second disposing portion 109 are located at the same height at the time of the roller portion 107 being located at the center of the transfer object 103. On completion of the transfer process according to the present modification, the second disposing portion 109 is lowered so that the second disposing portion 109 is located at the same height as that of the transfer object 103. It should be noted that at this point in time, the first disposing portion 108 is located at the height where the second disposing portion 109 is located at the start of the transfer process according to the present modification.

Such a transfer method makes it possible to adhere and peel off the film portion 102 in one step without reciprocating the roller portion 107. This is because a configuration within a region 1002 in the figure is equivalent to a configuration within a region 1001 shown in FIG. 10A. That is, the configuration for pressing the transfer object 103 via the film portion 102 with the roller portion 107 while lifting the first frame side 111 is the same as that in the example shown in FIG. 10A.

Accordingly, the adhesive agent 104 can also be transferred to the transfer object 103 by such a method. Thus, the transfer method according to the present modification makes it possible to stably transfer a transfer material to an object without reciprocating the roller portion 107.

Second Embodiment

Hereinafter, a second embodiment in the technique according to the present disclosure will be described with reference to the drawings. In the following description, the same sign and name will be used for a constituent similar to or corresponding to that in the first embodiment, the description of the constituent will be omitted as appropriate, and differences will be mainly described. The present embodiment is different from the first embodiment in that the frame portion 110 is deformed upward. An object of the present embodiment is to more stably transfer a transfer material to a transfer object.

Figure 11:
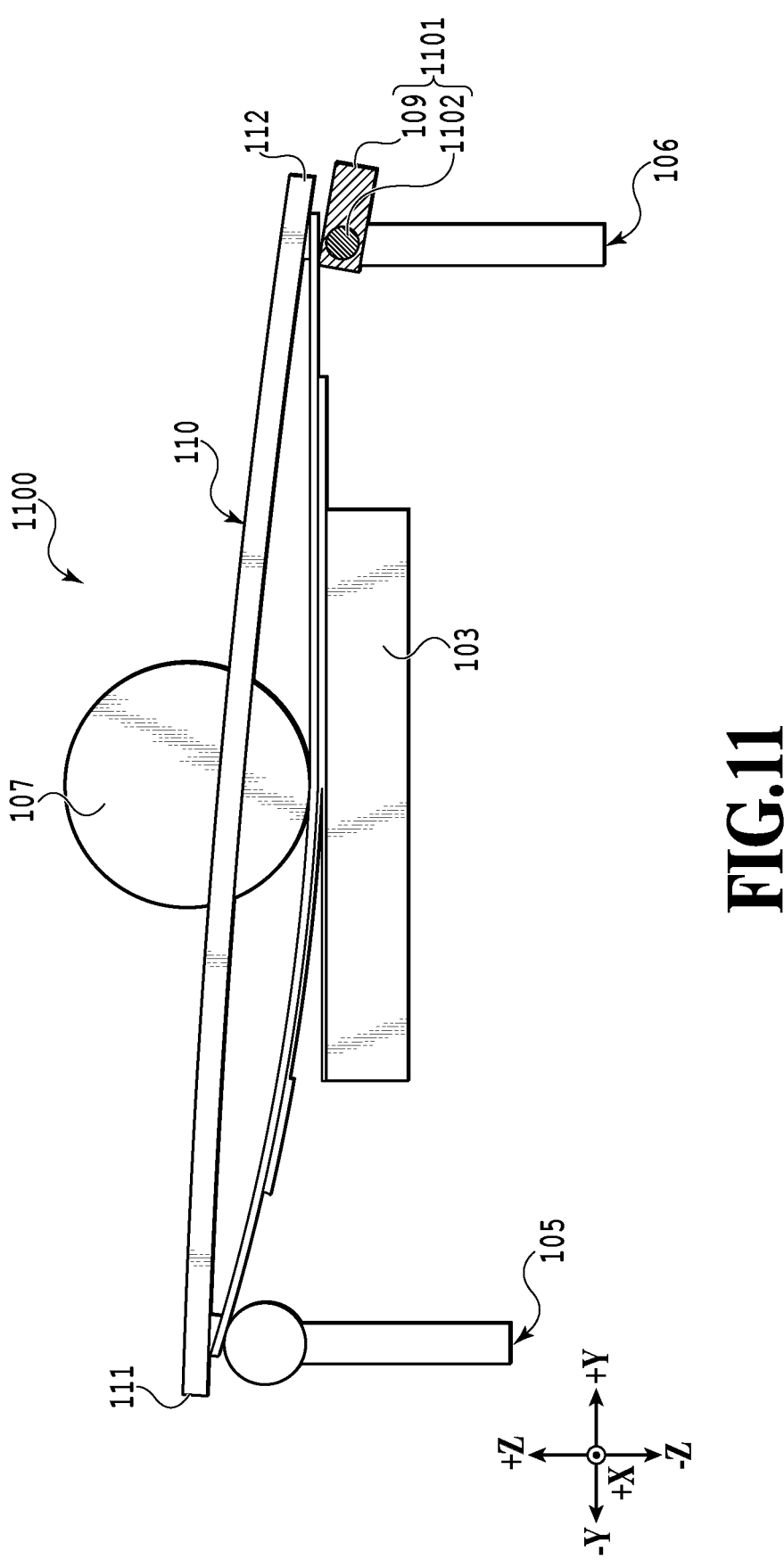
FIG. 11 is a schematic side view of the transfer apparatus according to one embodiment.

FIG. 11 is a schematic side view of a second transfer apparatus 1100 according to the present embodiment. As shown in FIG. 11, the second transfer apparatus 1100 includes the second supporting base 106. The second supporting base 106 according to the present embodiment includes a swinging portion 1101 swingable along with a change in the posture of the second frame side 112. In an illustrated example, the swinging portion 1101 includes the second disposing portion 109 freely swingable about a swing shaft 1102.

In the present embodiment, the second frame side 112 is disposed on the second disposing portion 109 of the swinging portion 1101 swingable along with a change in the posture of the second frame side 112. In the peeling step according to the present embodiment, as the roller portion 107 presses the film portion 102, the frame portion 110 warps in a direction opposite to the direction in which the film portion 102 bends. In a case where the first frame side 111 is lifted by the first supporting base 105, the second frame side 112 presses down the swinging portion 1101. The second frame side 112 presses down the swinging portion 1101, so that the second disposing portion 109 swings about the swing shaft 1102. It should be noted that in the illustrated example, the second disposing portion 109 swings clockwise. Since the swinging portion 1101 swings, in a case where the first frame side 111 is lifted, the second frame side 112 also tilts downward by the amount of elevation of the first frame side 111.

Thus, in the present embodiment, the frame portion 110 does not warp just by lifting the first frame side 111.

According to such a configuration, the operation of elevating the first supporting base 105 is performed more smoothly than in the first embodiment without being hindered. In the present embodiment, the film portion 102 is pressed by the roller portion 107, and the frame portion 110 warps upward by the first frame side 111 and the second frame side 112 that fix the film portion 102 being pulled downward.

Figure 12:
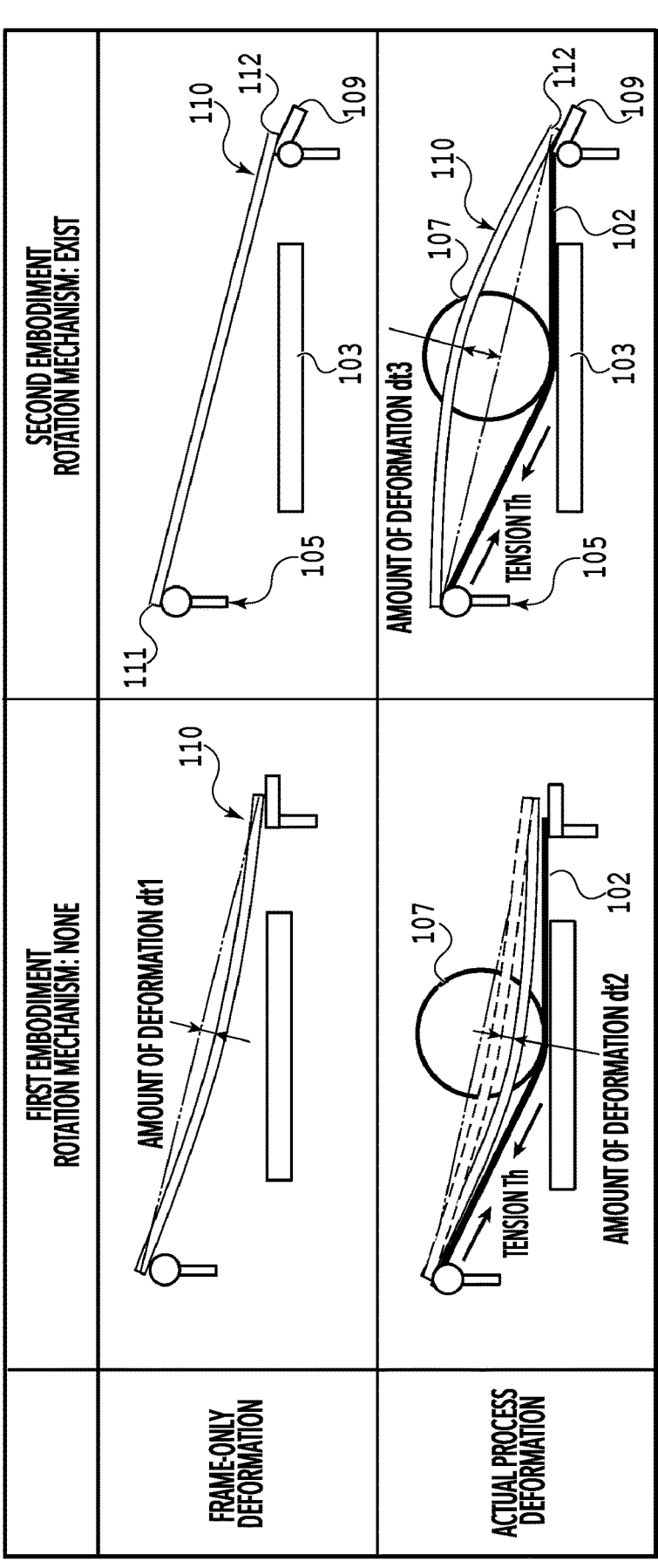
FIG. 12 is a diagram for explaining the relationship between deformation of the frame portion and the tension applied to the film portion according to one embodiment.

FIG. 12 is a diagram for explaining the relationship between the deformation of the frame portion 110 and tension applied to the film portion 102 according to the present embodiment. As shown in an upper left column in the figure, in the first embodiment, there is a case where the frame portion 110 is warped simply by lifting the first frame side 111.

As shown in an upper right column in the figure, in a case where the roller portion 107 does not press the film portion 102, even in a case where the first frame side 111 is lifted by the second disposing portion 109 swinging, the frame portion 110 is not deformed. This is because even in a case where the second disposing portion 109 swings in accordance with a change in the posture of the frame portion 110 and the second frame side 112 presses against the second disposing portion 109, the pressing force escapes due to the swinging of the second disposing portion 109. Accordingly, in the present embodiment, there is no need to consider deformation of the frame portion 110 itself caused by lifting the first frame side 111.

On the other hand, as shown in a lower right column in the figure, in a case where the film portion 102 is pressed by the roller portion 107 while the frame portion 110 is not deformed, the film portion 102 is deformed downward. Since the film portion 102 is fixed to the first frame side 111 and the second frame side 112, the first frame side 111 and the second frame side 112 are also pulled downward. As a result, in the present embodiment, the frame portion 110 is deformed upward (in the +Z direction in the figure).

Assuming that the amount of deformation of the frame portion 110 in this case is "dt3," the film tension "Th" in the present embodiment can be expressed by Formula 6 based on Formula 5 described above.

$$Th = \frac{16Ebh^2}{3L^2} \times dt3 \qquad \text{Formula 6}$$

According to such a configuration, since there is no obstacle or the like above the frame portion 110, space for deformation can be increased. Accordingly, the deformation of the frame portion 110 according to the present embodiment is less likely to be affected by peeling conditions (such as a speed at the time of elevating the first supporting base 105 and a distance). As a result of the effects of the peeling conditions being less than in the first embodiment, the peeling method according to the present embodiment allows the film tension to be applied to the transfer object 103 more stably than in the first embodiment. Thus, the transfer method according to the present embodiment makes it possible to transfer a transfer material to an object more stably than in the first embodiment.

Modification of Second Embodiment

Figure 13:
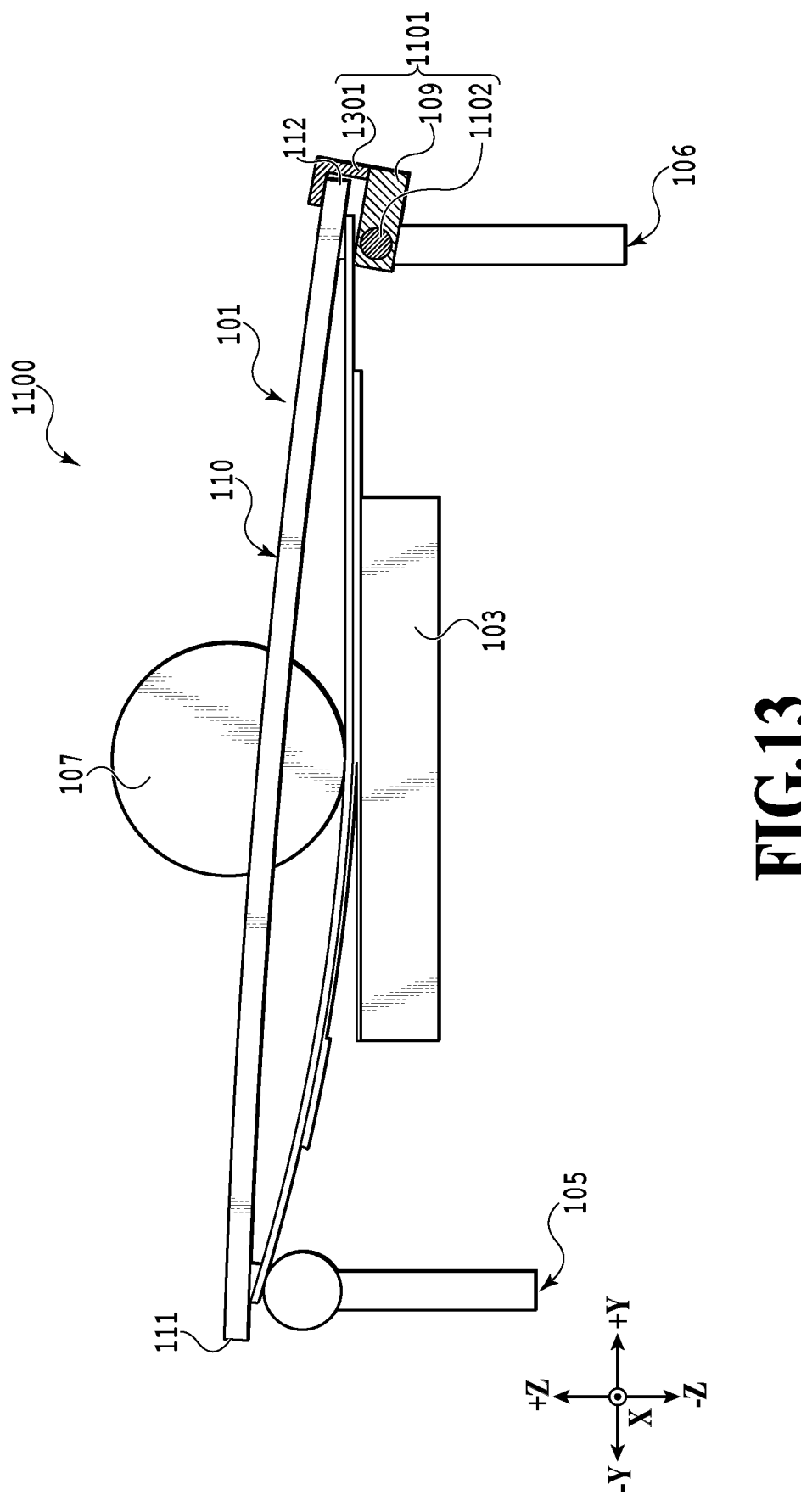
FIG. 13 is a schematic side view of the transfer apparatus according to one modification.

FIG. 13 is a schematic side view of the second transfer apparatus 1100 according to the present modification. As shown in FIG. 13, the swinging portion 1101 according to the present modification includes an abutting portion 1301 against which the second frame side 112 can abut. In the present modification, in a case where the first frame side 111 is lifted, the frame portion 110 moves toward the abutting portion 1301 and abuts against the abutting portion 1301. In a case where the film portion 102 is pressed by the roller portion 107 in this state, the frame portion 110 warps upward as described above.

In a case where the frame portion 110 returns to its original shape from a warped state, the second frame side 112 is fixed to the abutting portion 1301, so that the release of an elastic restoring force of the frame portion 110 is suppressed. That is, according to such a configuration, in a case where the frame portion 110 returns to its original shape, all elastic restoring forces of the frame portion 110 can be applied in a direction such that the first frame side 111 moves away from the abutting portion 1301.

Thus, such a peeling method can apply film tension to peel off the adhesive agent 104 more stably than in the first embodiment. Therefore, the transfer method according to the present modification makes it possible to transfer a transfer material to an object more stably than in the first embodiment.

EXAMPLE

A description will be given below of examples of the transfer method according to the present disclosure. Although the following description will be made with reference to FIGS. 14 and 15 and Tables 1 and 2, one technically preferable example will be merely described. Specifically, the technical scope of the present disclosure is not limited.

Figures 14A, 14B:
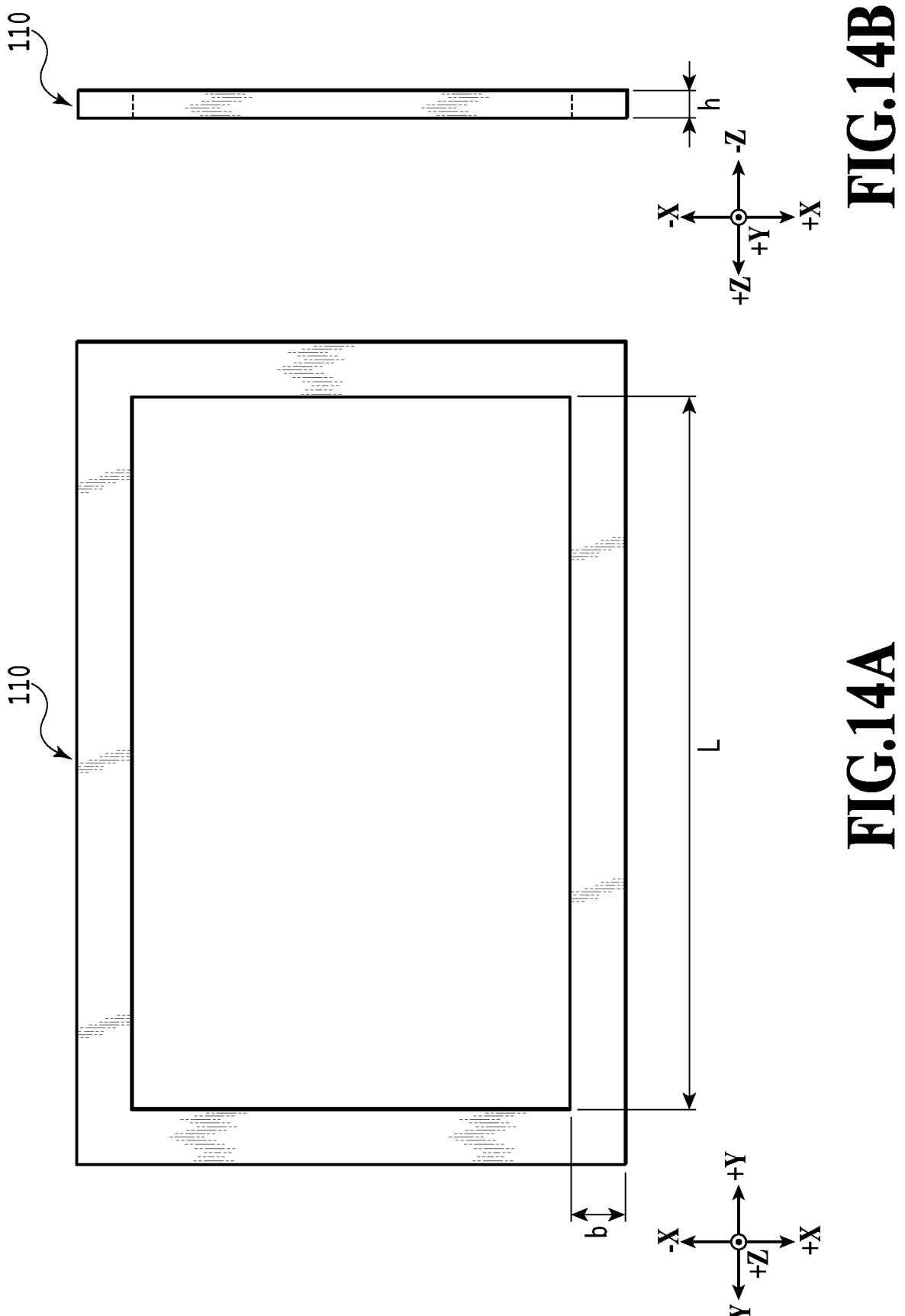
FIGS. 14A and 14B are schematic diagrams showing an example of the frame portion.

FIGS. 14A and 14B are schematic diagrams showing the frame portion 110 used in the examples according to the present disclosure. FIG. 14A is a plan view of the frame portion 110. In the figure, "b" indicates the width of a side (the length in the X direction in the figure) of the frame portion 110. In the figure, "L" indicates the length (the length in the Y direction in the figure) of a long side inside the frame portion 110.

FIG. 14B is a rear view of the frame portion 110. In the figure, "h" indicates the height (the length in the Z direction in the figure) of the frame portion 110.

TABLE 1

| Frame | Material | Young's modulus (GPa) |
|---|---|---|
| Frame 1 | SUS402J2 | 202 |
| Frame 2 | Carbon fiber-reinforced epoxy | 82 |
| Frame 3 | | 13 |
| Frame 4 | | 10 |

Example 1

In the present example, a frame 2 shown in Table 1 was prepared as the frame portion 110. As a material for the frame 2, carbon fiber-reinforced plastic was used.

The dimensions of the frame portion 110 shown in FIGS. 14A and 14B were L=275 mm, b=25 mm, and h=1.2 mm. As shown in "Table 1," the Young's modulus of the material according to the present embodiment was 82 GPa. A PET film having a thickness (the length in the Z direction in the figure) of 50 um was fixed to the first frame side 111 and the second frame side 112 with a two-sided adhesive tape.

After that, a solution of benzocyclobutene resin diluted with mesitylene was applied as an adhesive agent to the film portion by spin coating. As a result, a transfer material containing a benzocyclobutene resin having an average thickness (the length in the Z direction in the figure) of 8.6 um and a diameter of 210 mm was formed. Further, as a transfer object, an 8-inch silicon wafer was arranged on a stage set at 100° C. and was heated for a sufficient period of time.

First, the adhesive agent was adhered to the silicon wafer by synchronizing the elevation of the first supporting base and the pressing of the film portion by the roller portion. The adhesive agent was left in that state for a sufficient period of time and then heated. It should be noted that as a result of measuring the steady flow viscosity of the benzocyclobutene resin in advance, it was found that the steady flow viscosity of the benzocyclobutene resin was approximately 237 Pa seconds at 100° C.

Subsequently, in the peeling step, the film portion was pressed by moving the roller portion in the −Y direction at a speed of 3 mm/sec within a range of −120 mm to +120 mm from the center of the silicon wafer.

On the other hand, the first supporting base was elevated at a speed of 0.75 mm/sec so that the first disposing portion was located at a height of 60 mm from the upper surface of the silicon wafer. Conditions were set so that the times of the start and end of the elevation of the first supporting base and the times of the start and end of the pressing at the roller portion were synchronized. The width (the length in the X direction) of the roller portion was 220 mm. The pressure at the roller portion was 0.1 MPa.

In a case where a plurality of transfer experiments were carried out under such conditions, it was possible to always stably transfer the adhesive agent within 3 mm from the outer periphery of the 8-inch silicon wafer.

Example 2

In the present example, a frame 1 shown in Table 1 was prepared as the frame portion 110. The Young's modulus of the material in the frame 1 was 202 GPa. The transfer experiment was carried out under the same conditions as in Example 1 except for the above condition. In a case where a plurality of transfer experiments were carried out under such conditions, it was possible to always stably transfer the adhesive agent within 3 mm (a diameter of 194 mm) from the outer periphery of the silicon wafer.

Example 3

In the present example, a transfer apparatus provided with a rotating portion including an abutting portion was used. The transfer experiment was carried out under the same conditions as in Example 2 except for the above condition. In a case where a plurality of transfer experiments were carried out under such conditions, it was possible to always stably transfer the adhesive agent to the entire upper surface region (a diameter of 200 mm) of the silicon wafer.

Comparative Example 1

In the present comparative example, a frame 4 in Table 1 was prepared. The Young's modulus of a material in the frame 4 was 10 GPa. The film portion was fixed to the four sides of the frame portion 110. The transfer experiment was carried out under the same conditions as in Example 1 except for the above conditions. In a case where a plurality of transfer experiments were carried out under such conditions, in all experiments, peeling stopped near the center of the silicon wafer, and it was impossible to transfer the adhesive agent to the entire upper surface of a transfer object.

Comparative Example 2

In the present comparative example, the frame 1 in Table 1 was prepared. The Young's modulus of the material in the frame 1 was 202 GPa. The film portion was fixed to the four sides of the frame portion. The transfer experiment was carried out under the same conditions as in Example 1 except for the above conditions. In a case where a plurality of transfer experiments were carried out under such conditions, in all experiments, the frame portion 110 was lifted near the center of the silicon wafer, and the roller portion was floated. The film thickness distribution in the adhesive agent deteriorated, and it was impossible to perform stable transfer.

Comparative Example 3

In the present comparative example, the frame 4 in Table 1 was prepared. The Young's modulus of the material in the frame 4 was 10 GPa. The film portion was fixed to the first frame side and the second frame side. The transfer experiment was carried out under the same conditions as in Example 1 except for the above conditions. In a case where a plurality of transfer experiments were carried out under such conditions, in all transfer experiments, peeling stopped near the center of the silicon wafer, and it was impossible to transfer the adhesive agent to the entire upper surface of the silicon wafer.

Comparative Example 4

A frame 3 in Table 1 was prepared. The Young's modulus of a material was 13 GPa. The film portion was fixed to the first frame side and the second frame side of the frame portion. The transfer experiment was carried out under the same conditions as in Example 1 except for the above conditions. In a case where a plurality of transfer experiments were carried out, peeling stopped near the center of the silicon wafer in all experiments. That is, it was impossible to transfer the adhesive agent to the entire upper surface of the silicon wafer.

Summary of the Transfer Experiments

Figure 15A:
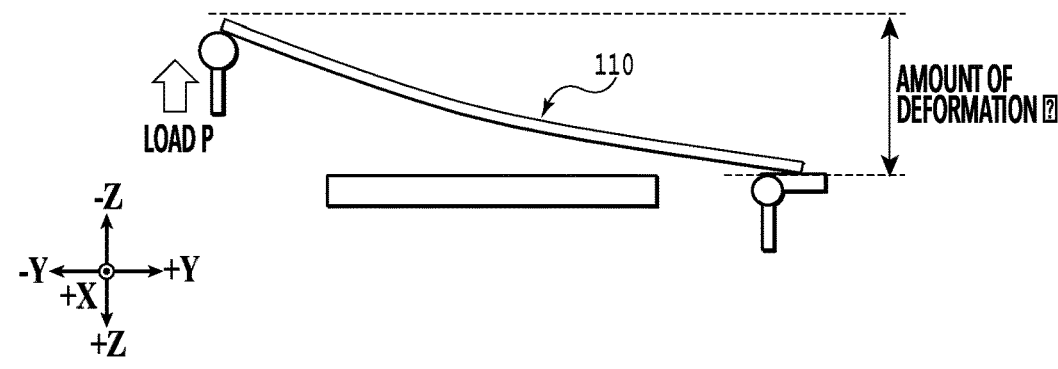
FIGS. 15A to 15C are diagrams for explaining Table 2.
Figure 15B:
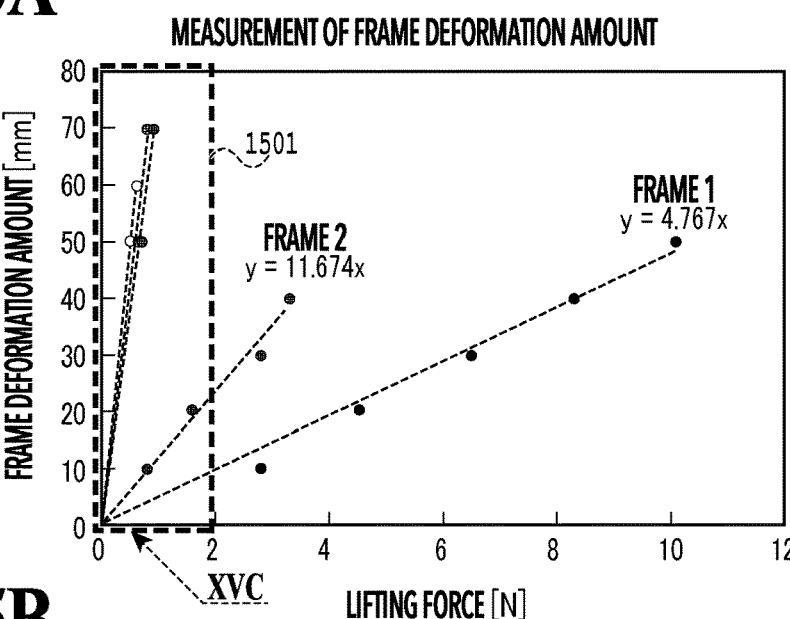
Figure 15C:
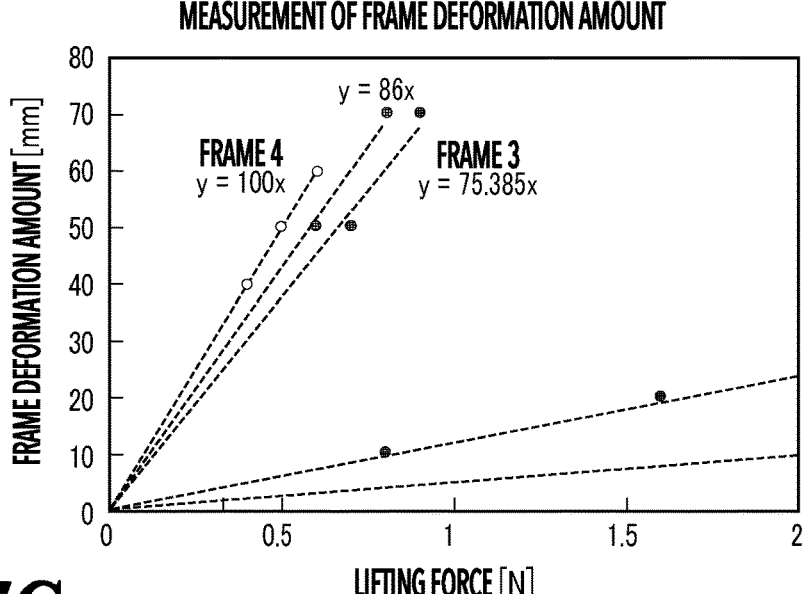

The results of the transfer experiments will be summarized and described using Table 2 and FIGS. 15A to 15C.

FIGS. 15A to 15C are diagrams for explaining Table 2.

FIG. 15A is a diagram showing the relationship between a load "P" to lift the completed frame portion 110 and the amount of deformation "S." As shown in FIG. 15A, the Young's modulus was obtained from the relationship between the load "P" and the amount of deformation "S." The following relationship can be obtained from a formula for obtaining the amount of deformation "S" at the time of applying the load "P" to the tip of a cantilever beam.

$$\delta = \frac{2L^3}{Ebh^3} \times P \qquad \text{Formula 7}$$

FIG. 15B is a diagram in which the amount of deformation "S" of each frame portion 110 measured in a case where the load "P" is constant is plotted.

FIG. 15C is an enlarged view of a region 1501 shown in FIG. 15B. Since there was a linear relationship, a linear approximation was performed to find an inclination. A Young's modulus "E" was obtained by substituting the dimensions of the frame portion 110 (see FIGS. 14A and 14B) into the coefficient of Formula 7 above. It should be noted that even in a case where the dimensions of the frame portion 110 are different, it is only required that Formula 7 be used to carry out a measurement.

OTHER EMBODIMENTS

In the above embodiments, the first disposing portion 108 has a cylindrical shape. The shape of the first disposing portion 108 is not limited to a cylindrical shape as long as the first frame side 111 can be disposed on the first disposing portion 108. In the first embodiment, the second supporting base 106 may include a drive mechanism for elevating and lowering, a mechanism for fixing the frame portion 110, or both of them.

In the first embodiment, examples of a method of heating the adhesive agent 104 include a method of heating the transfer object 103 with a heater table or the like. Another example of the method of heating the adhesive agent 104 is a method of heating the adhesive agent 104 using a heating roller in which a heater is arranged inside the roller portion 107. The method of heating the adhesive agent 104 may be selected as appropriate.

The above embodiments do not limit the technical scope of the present disclosure. It should be noted that the numerical values shown in the above embodiments are merely

TABLE 2

| | Comparative Example 1 | Comparative Example 2 | Comparative Example 3 | Comparative Example 4 | Example 1 | Example 2 | Example 3 |
|---|---|---|---|---|---|---|---|
| Frame | Frame 4 | Frame 1 | Frame 4 | Frame 3 | Frame 2 | | Frame 1 |
| Film fixation | | Fix all sides | | | Fix two sides | | |
| Tilting mechanism | | | None | | | | Exist |
| Young's modulus of material | 10 GPa | 202 GPa | E = 10 GPa | E = 13 GPa | E = 82 GPa | E = 202 GPa | E = 202 GPa |
| Result | Poor Suspension of peeling | Poor Roller floating | Poor Suspension of peeling | Poor Suspension of peeling | Good Transferring entire surface of effective region | Good Transferring effective region | Very good Transferring entire surface | examples, and the technical scope of the present disclosure is not limited to them. The relative arrangement, shapes, and the like of the constituents described in the embodiments are merely examples, and the technical scope of the present disclosure is not intended to be limited only to them. Further, not all combinations of the features described in the present embodiments are essential to the solution in the present disclosure. The technique according to the present disclosure is not limited to the embodiments and also includes one obtained by further combining them and one obtained by applying them to another technical field.

The method of transferring a transfer material according to the present disclosure makes it possible to stably transfer the transfer material to a transfer object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-204322, filed Dec. 21, 2022, which is hereby incorporated by reference wherein in its entirety.

What is claimed is:

1. A transfer method for transferring to an object a transfer material applied to a film portion fixed to a frame portion, the transfer method comprising:

adhering the film portion to the object so that a layer of the transfer material is formed between the object and the film portion; and peeling off the film portion from the object by, while elevating a first side of the frame portion above a second side opposite to the first side, moving, in a direction from the first side toward the second side, a roller portion pressing a surface to which the transfer material is not applied in the film portion while rotating, wherein in the peeling, while the first side is elevated, the roller portion is moved in the direction from the first side toward the second side so that a position of a boundary line between a peeled region where the film portion is peeled off from the object and an unpeeled region where the film portion is not peeled off from the object coincides with a position of a rotation shaft in the roller portion, wherein the film portion is not fixed to a region other than the first side and the second side, and wherein in the peeling, the frame portion warps along with elevation of the first side, and the film portion bends in a direction identical to a direction in which the frame portion warps.

2. The transfer method according to claim 1, wherein in the adhering, the first side is lowered with respect to the object.

3. The transfer method according to claim 2, wherein in the adhering, while the first side is lowered, the roller portion is moved in a direction from the second side toward the first side so that a position of a boundary line between an adhered region where the film portion is adhered to the object and an unadhered region where the film portion is not adhered to the object coincides with the position of the rotation shaft of the roller portion pressing the surface to which the transfer material is not applied in the film portion while rotating.

4. The transfer method according to claim 1, wherein in the peeling, the second side is lowered below a height at which the first side is located.

5. The transfer method according to claim 1, wherein a Young's modulus of the frame portion is 82 GPa or more.

6. The transfer method according to claim 1, wherein the transfer material is an adhesive agent.

7. The transfer method according to claim 6, wherein a steady flow viscosity of the adhesive agent is 237 Pa seconds or less.

8. The transfer method according to claim 1, wherein the object is a silicon wafer.

9. A transfer method for transferring to an object a transfer material applied to a film portion fixed to a frame portion, the transfer method comprising:

adhering the film portion to the object so that a layer of the transfer material is formed between the object and the film portion; and peeling off the film portion from the object by, while elevating a first side of the frame portion above a second side opposite to the first side, moving, in a direction from the first side toward the second side, a roller portion pressing a surface to which the transfer material is not applied in the film portion while rotating, wherein in the peeling, while the first side is elevated, the roller portion is moved in the direction from the first side toward the second side so that a position of a boundary line between a peeled region where the film portion is peeled off from the object and an unpeeled region where the film portion is not peeled off from the object coincides with a position of a rotation shaft in the roller portion, wherein the film portion is not fixed to a region other than the first side and the second side, wherein the second side is disposed on a swinging portion swingable according to a posture of the second side, and wherein in the peeling, as the roller portion presses the film portion, the frame portion warps in a direction opposite to a direction in which the film portion bends.

* * * * *